United States Patent

Matsuo et al.

[11] Patent Number: 5,500,926
[45] Date of Patent: Mar. 19, 1996

[54] MECHANISM CONCEPTUAL DRAWING OPERATION DISPLAY APPARATUS, TRANSMISSION APPARATUS AND MECHANISM CONCEPTUAL DRAWING FORMATION APPARATUS

[75] Inventors: Eiji Matsuo; Yoshinori Kakuta, both of Nagaokakyo, Japan

[73] Assignee: Mitsubishi Denki Kabushiki Kaisha, Tokyo, Japan

[21] Appl. No.: 971,845

[22] PCT Filed: Jun. 3, 1992

[86] PCT No.: PCT/JP92/00718

§ 371 Date: Feb. 3, 1993

§ 102(e) Date: Feb. 3, 1993

[87] PCT Pub. No.: WO92/22038

PCT Pub. Date: Dec. 10, 1992

[30] Foreign Application Priority Data

Jun. 3, 1991 [JP] Japan ................................. 3-131019
Jun. 3, 1991 [JP] Japan ................................. 3-131020

[51] Int. Cl.$^6$ ................................................ G06F 15/16
[52] U.S. Cl. ................................................ 395/133
[58] Field of Search ................................. 395/143, 141, 395/118, 119, 120, 121, 133, 155, 161; 345/133

[56] References Cited

U.S. PATENT DOCUMENTS

| 5,185,599 | 2/1993 | Doornink et al. | 340/747 |
| 5,307,456 | 4/1994 | McKay | 395/154 |
| 5,313,408 | 5/1994 | Goto | 364/514 |

FOREIGN PATENT DOCUMENTS

| 59-43465 | 3/1984 | Japan . |
| 61-177578 | 8/1986 | Japan . |
| 1291379 | 11/1989 | Japan . |

OTHER PUBLICATIONS

"Proposal of Acceleration of Examination for Patent Applications" The Patent, vol. 42, No. 11, 1989.
"New Drawing Method of Patent Drawing (I)" Machine Design, vol. 34, No. 12, Dec. 1990—pp. 84, 86 & 88.
"New Drawing Method of Patent Drawing (II)" Machine Design, vol. 35, No. 1, pp. 82–83, Jan. 1991.

Primary Examiner—Phu K. Nguyen

[57] ABSTRACT

After separating the moving and fixed parts of a mechanism conceptual view, the apparatus moves and/or rotates the movable parts. The movable and fixed parts are synthesized and dynamically displayed to illustrate the motion of the machine represented by the mechanism conceptual view. Symbols arranged at different angles in a selection area of a display are used to create the mechanism conceptual view, and a coding device in the apparatus codes the mechanism conceptual view for transmission over a telephone line.

24 Claims, 28 Drawing Sheets

MECHANISM CONCEPTUAL DRAWING OPERATION DISPLAY APPARATUS, TRANSMISSION APPARATUS AND MECHANISM CONCEPTUAL DRAWING FORMATION APPARATUS

TECHNICAL FIELD

The present invention relates to an apparatus for displaying motions of a mechanism in order of operation on the basis of data of mechanism conceptual drawings formed with the aid of a computer in accordance with a mechanism conceptual drawing formation method for the purpose of readily understanding the operation of a machine or the like, a data transmission apparatus and a mechanism conceptual drawing formation apparatus.

BACKGROUND ART

As means for exhibiting an operation of a machine, conventionally, trigonometric views, an exploded view, a perspective view, an operational view composed thereof aligned in operational order, and the like have been used for illustrating the machine, and by using such views showing the form of the actual machine, the operation of the machine is explained. In order to carry out an exact and quick understanding of the above-described drawings, conventionally, for example, a proposal for expressing mechanism drawings by using conceptual views as a conception approximate drawing method has been done in a column of "an upward air current", the Patent, November, 1985, Japanese Patent Attorney Association, but this proposal does not disclose details of a specific drawing method. Further, in this case, means for displaying a mechanism operation in an actual motion state is never considered. Also, conventionally, although an apparatus for directly transmitting image data of a computer to a facsimile is sold at a market, the drawing formation of the conceptual views of the mechanism and the transmission of the drawn views can not be performed in the same apparatus.

In general, in the conventional drawing formation method, since the views drawn on the basis of the drawings illustrating the exact shape of the actual machine are used, the only expression of the machine form is emphasized, and thus, one cannot understand the operation of the machine. In order to display the action of the machine with a conventional drawing method, a dedicated model is required for analyzing the mechanism of the machine. Creation of such a new model is troublesome, and moreover, even with such a model, it is not possible to analyze a complicated mechanism and kinetically displaying the result of the analysis (i.e. displaying the real action of the machine). Further the direct transmission of the data of the conceptual views to the facsimile can not be carried out. Also, in accordance with the conventional drawing method, in particular, since direct lines for coupling symbols of mechanism elements are directly drawn in the drawing formation of the perspective view, it is required to use a plurality of symbols for constituting the machine, and thus to draw the corresponding number of symbols requires much drawing time.

DISCLOSURE OF INVENTION

The present invention is carried out for solving the aforementioned problems of the prior art. It is therefore an object of the present invention to provide an apparatus capable of readily forming a motion operation drawing from a conceptual view of a mechanism according to an elapsed time and displaying the motion operation drawing.

Also, it is another object of the present invention to provide an apparatus for directly transmitting a conceptual view of a mechanism to a facsimile via a telephone line. Further, it is another object to provide an apparatus capable of forming a mechanism conceptual view in a short time by a simple operation.

Further, it is another object of the present invention to provide an inexpensive apparatus capable of forming a perspective mechanism conceptual view based on an orthographic projection method by only a two-dimensional coordinate input means without requiring a three-dimensional input means.

Further, it is another object of the present invention to provide an apparatus capable of carrying out understanding of a construction and an operation of a mechanism conceptual view in a short time.

Also, it is another object of the present invention to provide an apparatus for forming a conceptual view to be readily understood by a third party.

A mechanism conceptual drawing operation display apparatus and a transmission apparatus according to the present invention includes an arithmetic device composed of an integrated circuit or the like; a memory device composed of an integrated circuit or the like; an auxiliary memory device composed of a magnetic recording device or the like; a display device composed of a CRT or the like; a drawing formation device composed of a plotter or the like; an input device composed of a coordinate position indicating device and a key board; and an image transmission coding device including an arithmetic device composed of an integrated circuit or the like, and a memory device composed of an integrated circuit or the like.

Also, an apparatus according to the present invention includes recognition means for recognizing movable parts and fixed parts on the basis of conceptual view data formed in an apparatus for forming a mechanism conceptual view for expressing an operation of a machine; separation means for separating the movable parts and the fixed parts; moving means for moving the movable parts; rotating means for rotating the movable parts; synthesis means for synthesizing the movable parts and the fixed parts; dynamic display means for dynamically displaying motion of the mechanism conceptual view according to an elapsed time; and plural state view display means for simultaneously displaying motions of a plurality of states of mechanism conceptual view according to the elapsed time. Furthermore, an apparatus according to the present invention includes coding means for coding image data on the basis of conceptual view data formed by an apparatus for forming a mechanism conceptual view for expressing an operation of a machine; storage means for storing coded data; rearranging means for rearranging stored data; modulating means for modulating the data into sound signals; and output means for outputting the signals to a telephone line.

Means for displaying motion symbols to be elements of a mechanism operation and mechanism element symbols to be the base of its operation, means for selecting predetermined symbols from the displayed mechanism element symbols, means for arranging the selected symbols corresponding to the operation of a machine to be expressed, means for connecting the arranged symbols by lines corresponding to the form of the machine, and means for adding motion symbols for exhibiting motion directions to the mechanism element symbols to display the same are realized by the arithmetic device, the memory device, the drawing formation device and the input device.

The mechanism conceptual drawing formation apparatus according to the present invention includes a plurality of symbol menus arranged at different angles, the symbol menus having a same form or a same meaning of symbol elements of the mechanism conceptual view to be displayed in order to be arranged in one drawing area.

Also, the mechanism conceptual drawing formation apparatus includes an intersecting line control means for dividing and deleting an intersecting part of any line when line information input from the input device intersects with a previously drawn line.

Also, the mechanism conceptual drawing formation apparatus includes a marking area having a marker for indicating an actual drawn area of a figure in a periphery of the drawn area.

Also, the mechanism conceptual drawing formation apparatus includes an arithmetic device for calculating a distance between start and end points of a leader line by indicating the start and end points by an input unit, and a wave line formation means for forming the leader line of a wave line form passing through points of divisions divided into any number.

Further, the mechanism conceptual drawing formation apparatus includes a simplified 2.5 dimensional coordinate transformation means capable of adjusting an actual length of a line of a mechanism element depending on a rotating angle when the mechanism element drawn in a drawn area is rotationally moved.

Furthermore, the mechanism conceptual drawing formation apparatus includes a display device capable of displaying different color tones depending on kinds of symbols, before and after the motion of a mechanism to be expressed and up and down of a mechanism element to be arranged, and color tone conversion means capable of transmitting information of the color tones stored in a memory device to another device of either an auxiliary memory unit or a mechanism conceptual drawing operation display apparatus.

In a drawing formation method of the mechanism conceptual drawing formation apparatus constructed as described above, one of the symbol elements having the same form and angle to be arranged is selected from a selection area and the selected one is arranged in a predetermined indicated position of a drawing area.

Also, when a drawn line intersects with a previously drawn mechanism element, division parts are formed in a certain line by a intersecting line control means and a position relationship between the mutually intersecting lines can be clear.

Also, the output mechanism conceptual view is converted into image data by a scanner or the like leading the marking corresponding to the drawn area.

Also, the leader line for corresponding the mechanism element to its number is formed to a wave form by a wave line formation means from a start point of the leader line and coordinates of the arrangement center of the number.

Further, when the perspective mechanism conceptual view based on the orthographic projection method is formed, in the rotational movement of the line, the line length is limited by isometric ellipses having the same rotational center passing through both the ends of the line.

Furthermore, when the clear expression is obtained by rather carrying out a color-separation before and after the motion, the color tone information indicated by the input device is color-separated in the display device by the color tone conversion means to display the color-separated mechanism on the display device, and this color tone information can be readable even when the data of the mechanism conceptual view are transmitted to another device.

BEST MODE FOR CARRYING OUT THE INVENTION

The first embodiment

Now, one embodiment of a mechanism conceptual drawing operation display apparatus according to the present invention will be described in detail with reference to the accompanying drawings.

Figure 1:
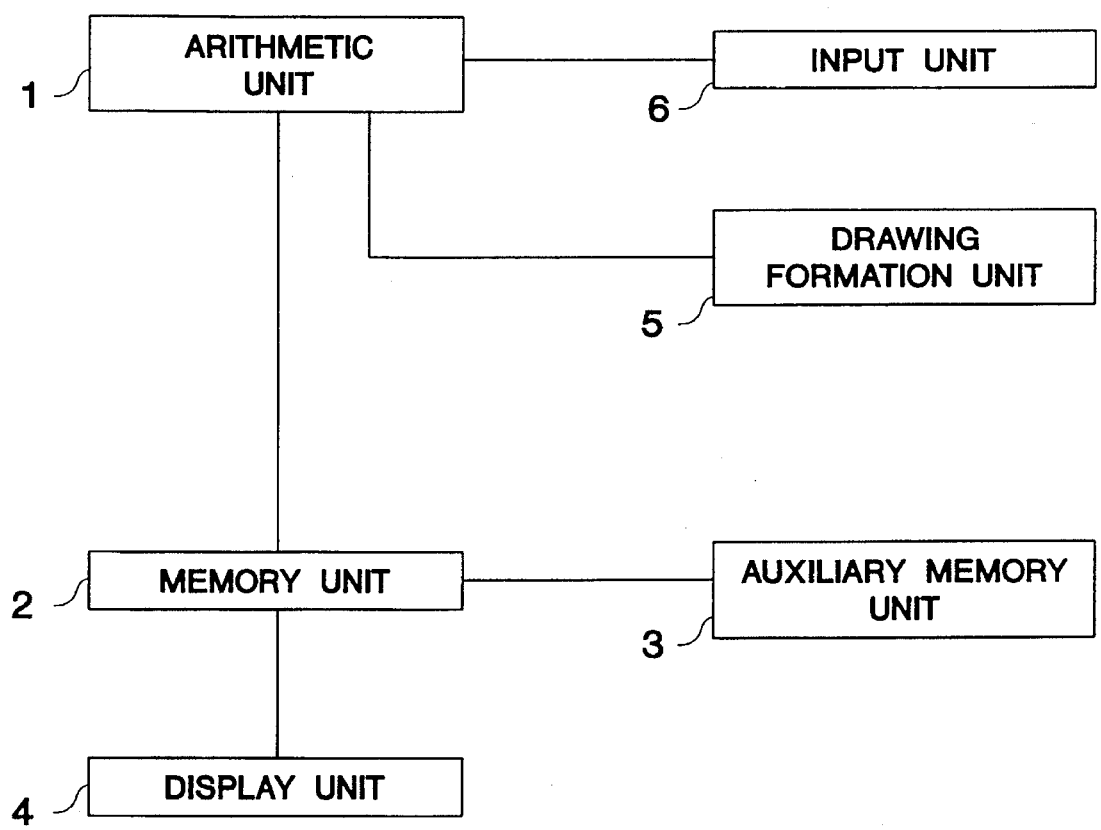
FIG. 1 is a block diagram of a first embodiment of a mechanism conceptual drawing operation display apparatus according to the present invention.

FIG. 1 shows a whole rough structure of the first embodiment of a mechanism conceptual drawing operation display apparatus according to the present invention, which comprises an arithmetic unit 1 composed of an integrated circuit or the like, a memory unit 2 composed of an integrated circuit or the like, an auxiliary memory unit 3 composed of a magnetic recording device or the like, a display unit 4 composed of a CRT or the like, a drawing formation unit 5 composed of a plotter or the like, and an input unit 6 composed of a coordinate position indicating device and a key board.

Figure 2:
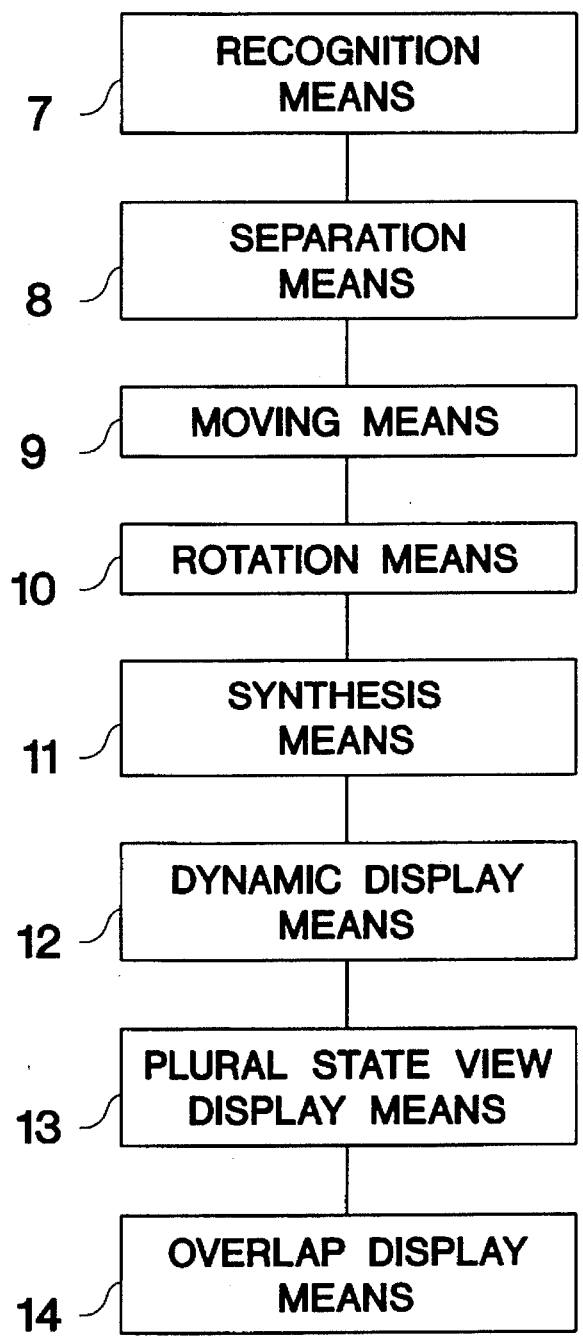
FIG. 2 is a block diagram of a first embodiment of a mechanism conceptual drawing operation display means according to the present invention.

FIG. 2 further shows detailed functional means of the first embodiment, which includes a recognition means 7 for recognizing movable parts and fixed parts in the drawing on the basis of conceptual view data formed in an apparatus for forming mechanism conceptual views for expressing an operation of a machine, a separation means 8 for separating the movable parts and the fixed parts, a moving means 9 for moving the movable parts to the desired position, a rotating means 10 for rotating the movable parts in their positions, a synthesis means 11 for synthesizing the movable parts and the fixed parts, a dynamic display means 12 for dynamically displaying motion of a mechanism conceptual view according to an elapsed time, a plural state view display means 13 for simultaneously displaying motions of a plurality of states of mechanism conceptual views according to the elapsed time, and an overlap display means 14 for displaying overlapped motions of a plurality of states of the views according to the elapsed time.

Next, the operation of the first embodiment will now be described. On the display unit 4 such as the CRT or the like as shown in FIG. 1, there is shown a mechanism conceptual view for expressing an operation of a machine, to be processed according to the present invention on the basis of data previously formed in a mechanism conceptual view formation apparatus. On the basis of this data, the recognition means 7 carries out a preprocessing for separating the movable parts and the fixed parts in the conceptual view.

Figure 3:
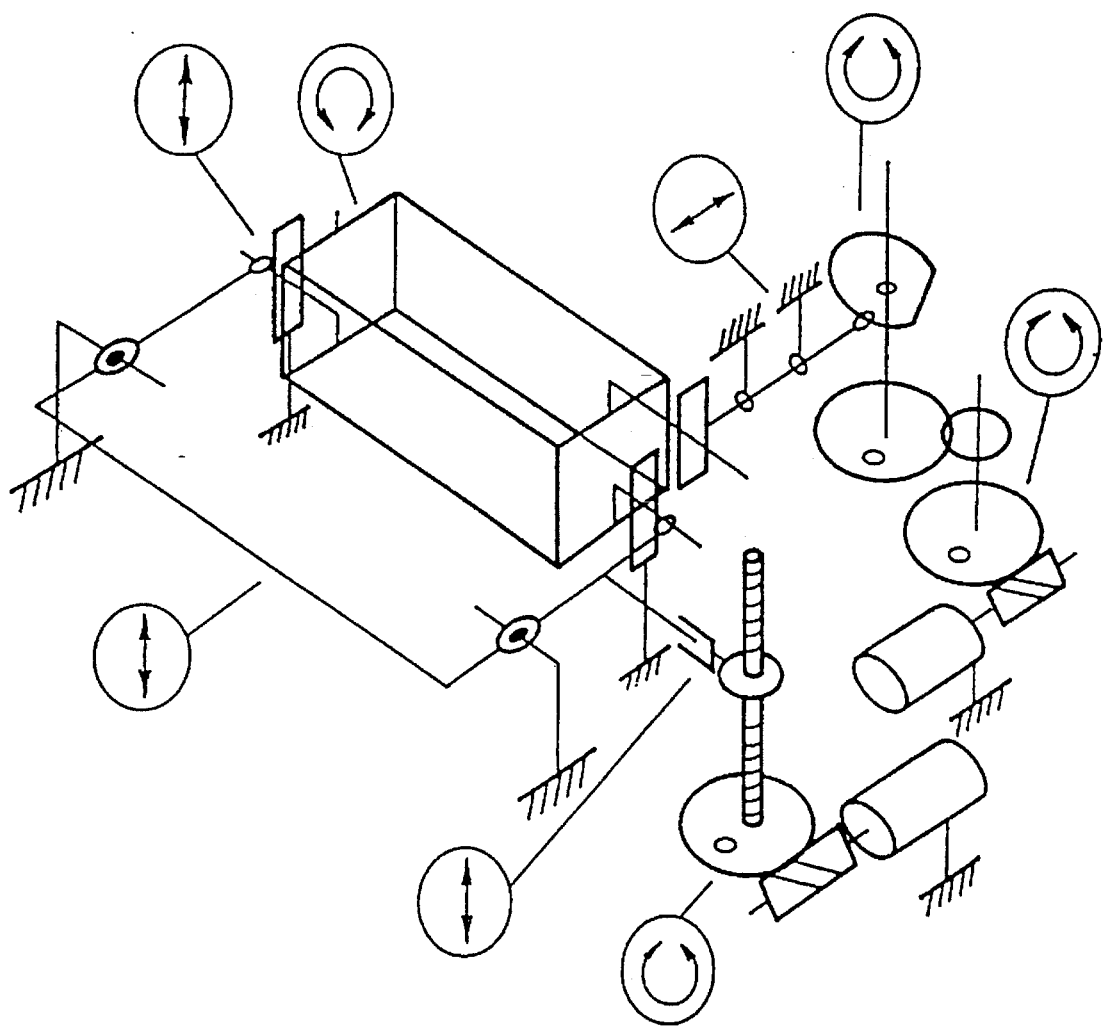
FIG. 3 is a mechanism conceptual view to be input data of an operation display realized by the first embodiment of the mechanism conceptual drawing operation display apparatus according to the present invention.
Figure 4:
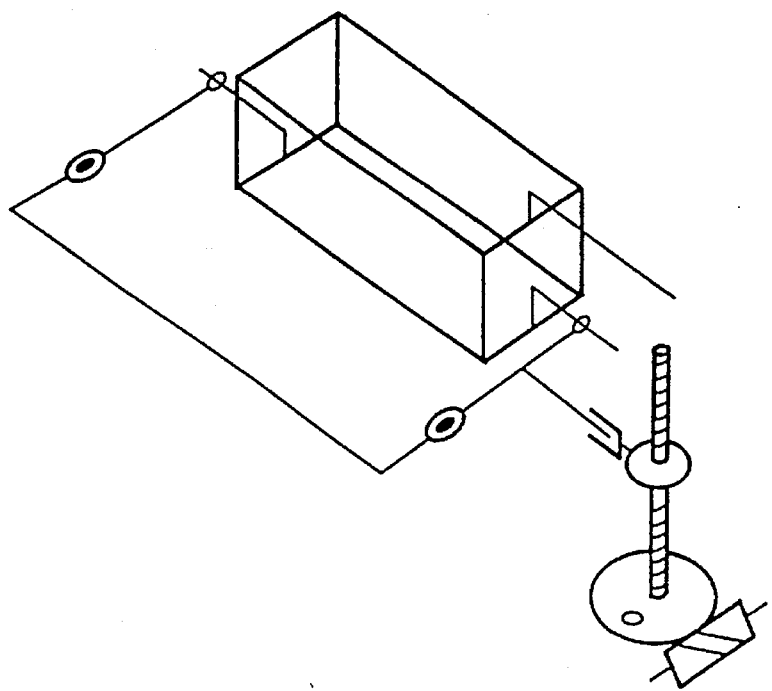
FIG. 4 is a mechanism conceptual view showing only movable parts picked up from the first embodiment.

Then, the explanation will be carried out with reference to mechanism conceptual views (FIG. 3 to FIG. 27, FIG. 30 and FIG. 31) output from a computer. For example, FIG. 3 is a conceptual view showing an apparatus for positioning a pick-up of an optical disk by two motors, in which its concept is exhibited in the form of diagram in a conventional manner. FIG. 4 shows the movable parts picked up from the system shown in FIG. 3 according to the present invention. For the recognition of this movable parts, two cases are prepared, that is, a case of an automatic calculation from the views before and after the motion and another case of a indication of the movable and fixed parts by an operator by using an input device such as a mouse or the like.

Figure 5:
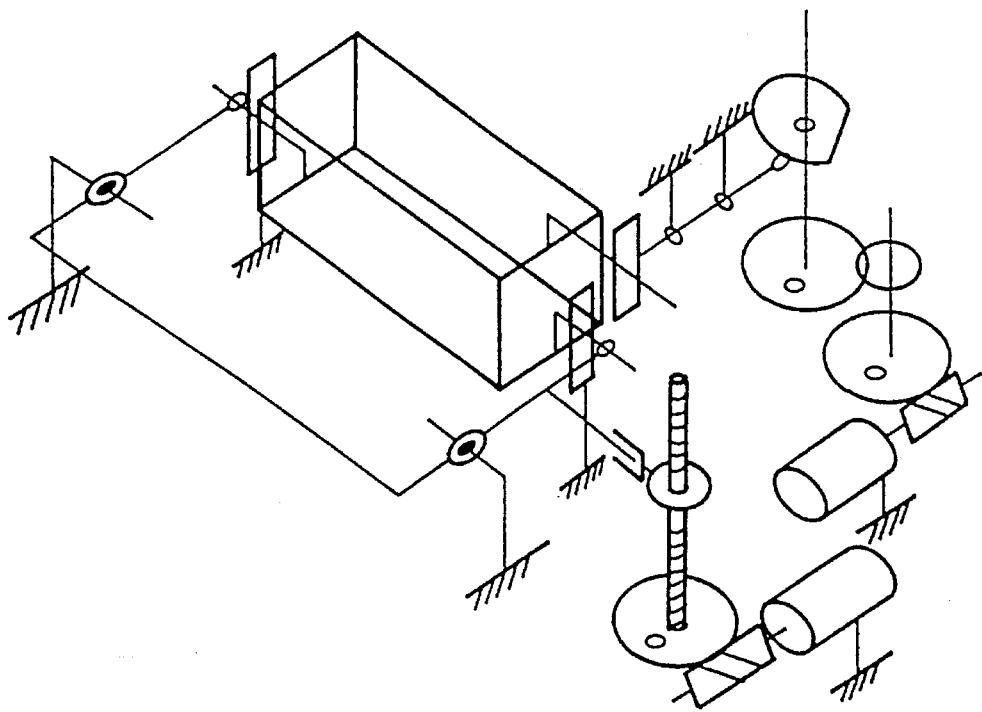
FIG. 5 is a mechanism conceptual view before motion in the first embodiment.
Figure 6:
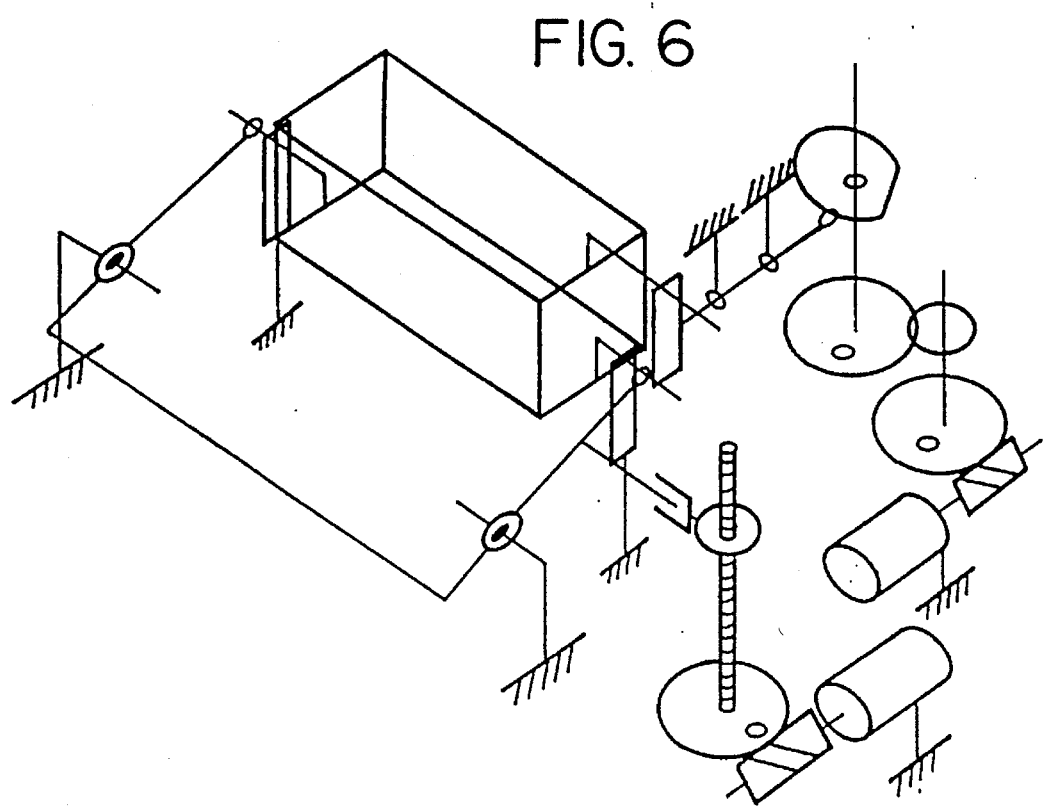
FIG. 6 is a mechanism conceptual view after motion in the first embodiment.

For example, by carrying out an image calculation from the states shown in FIG. 5 (motion indicating symbols are removed from FIG. 3) and FIG. 6 (moved a little from the state in FIG. 5), only the movable parts shown in FIG. 4 can be picked up. Also, in FIG. 5 or FIG. 6, the movable parts can be indicated by the operator by means of the input device such as the mouse or the like to similarly obtain FIG. 4.

Figure 7:
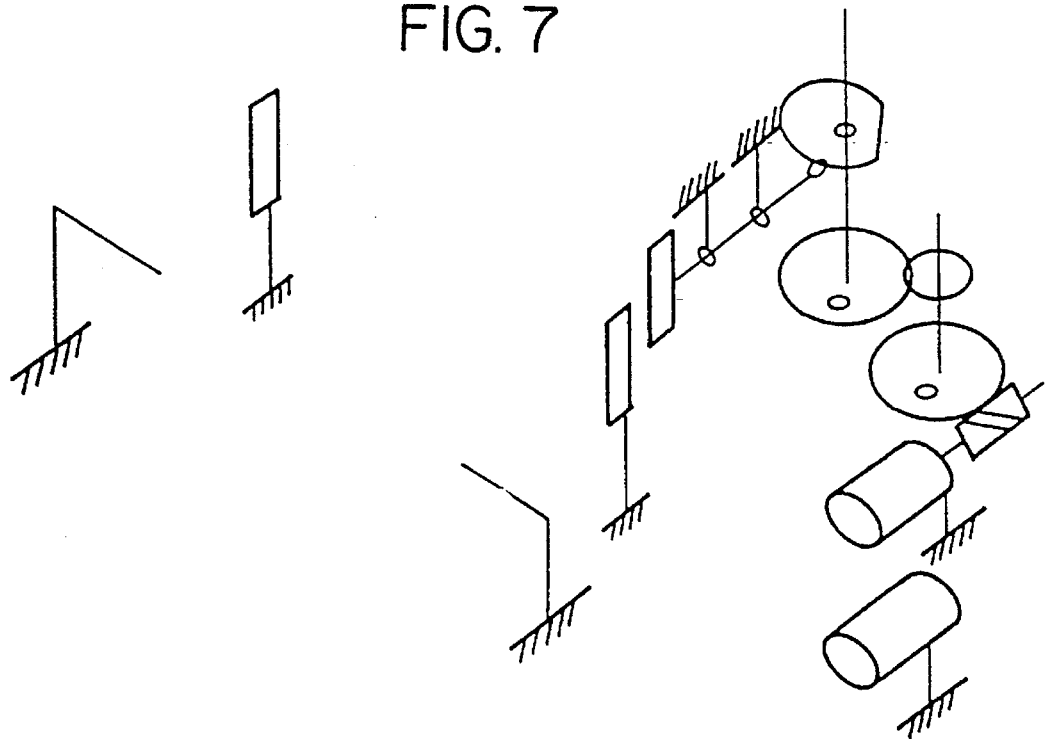
FIG. 7 is a mechanism conceptual view showing only fixed parts picked up from the first embodiment.
Figure 8:
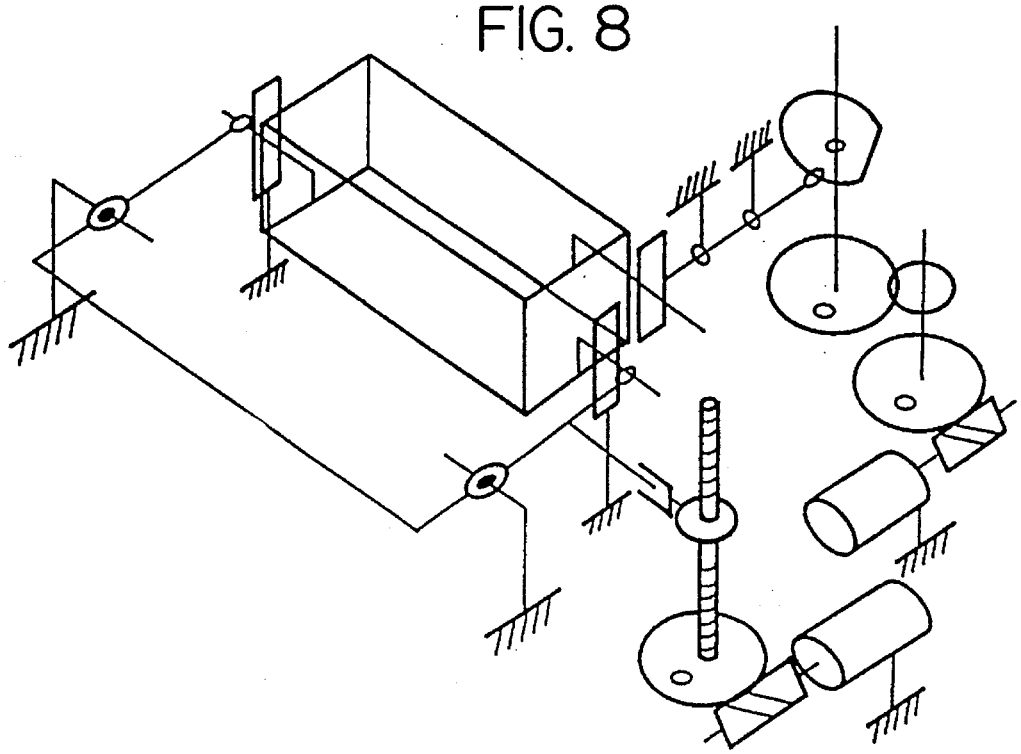
FIG. 8 is a mechanism conceptual view showing the motion displayed by the first embodiment of the mechanism conceptual drawing operation display apparatus.
Figure 9:
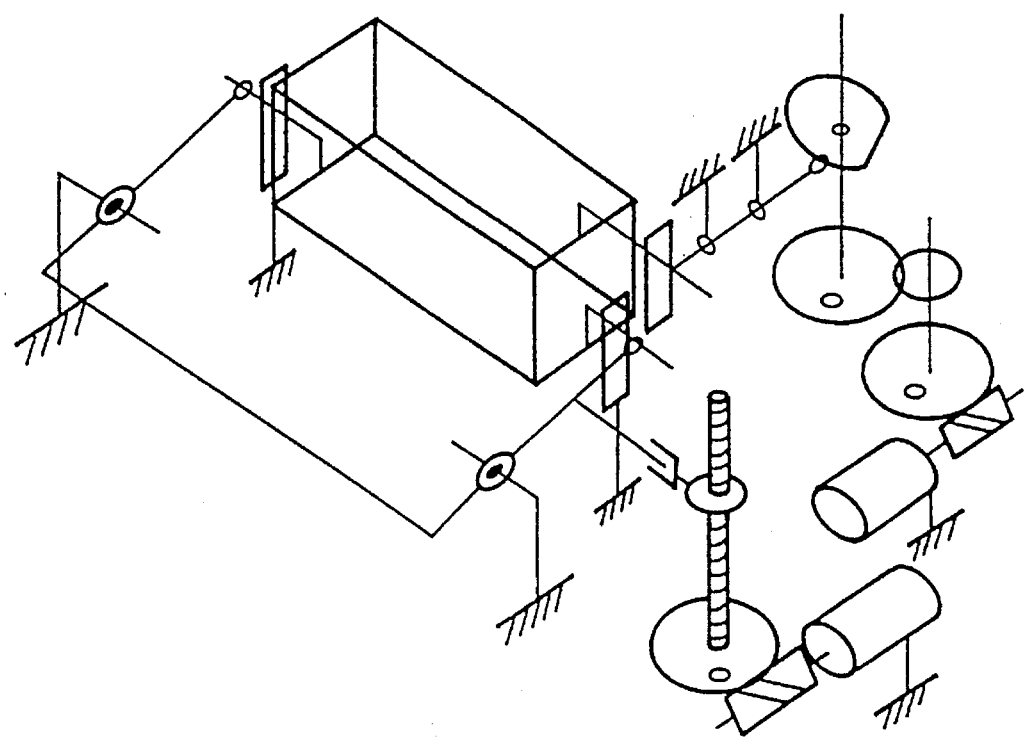
FIG. 9 is a mechanism conceptual view showing the motion displayed by the first embodiment of the mechanism conceptual drawing operation display apparatus.
Figure 10:
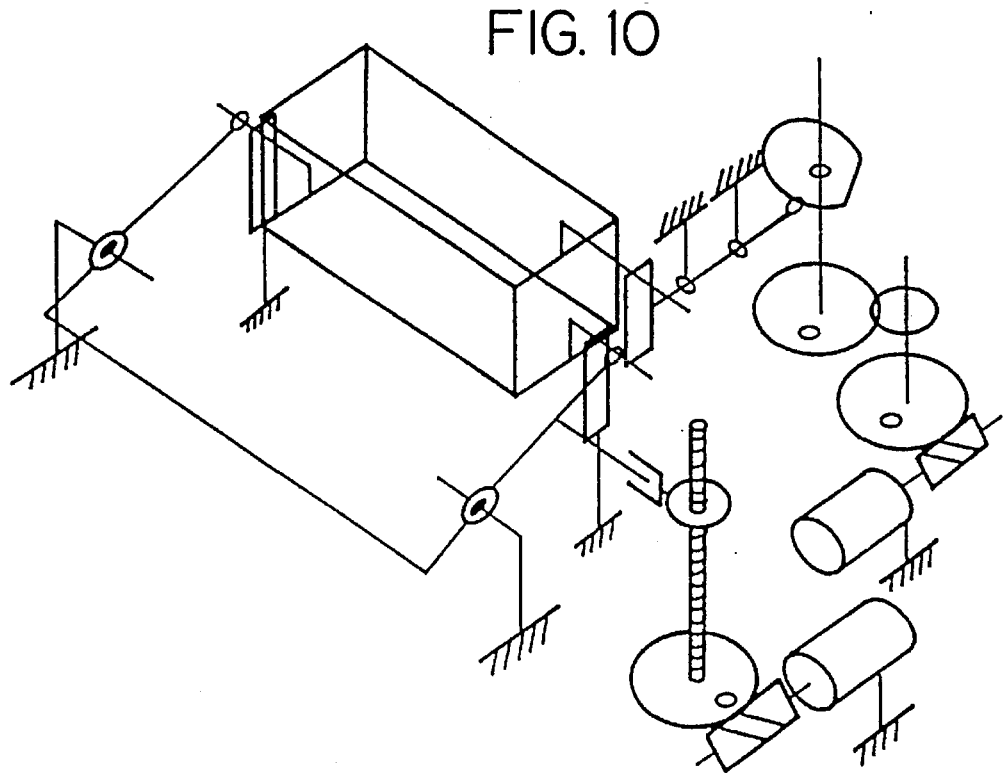
FIG. 10 is a mechanism conceptual view showing the motion displayed by the first embodiment of the mechanism conceptual drawing operation display apparatus.
Figure 11:
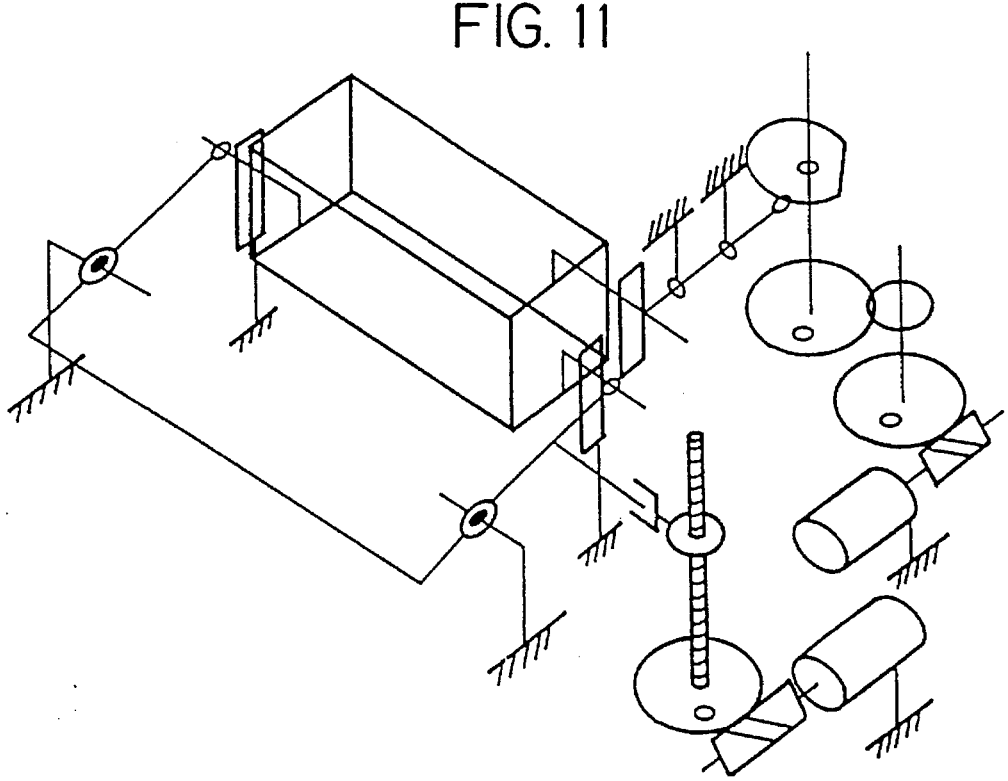
FIG. 11 is a mechanism conceptual view showing the motion displayed by the first embodiment of the mechanism conceptual drawing operation display apparatus.
Figure 12:
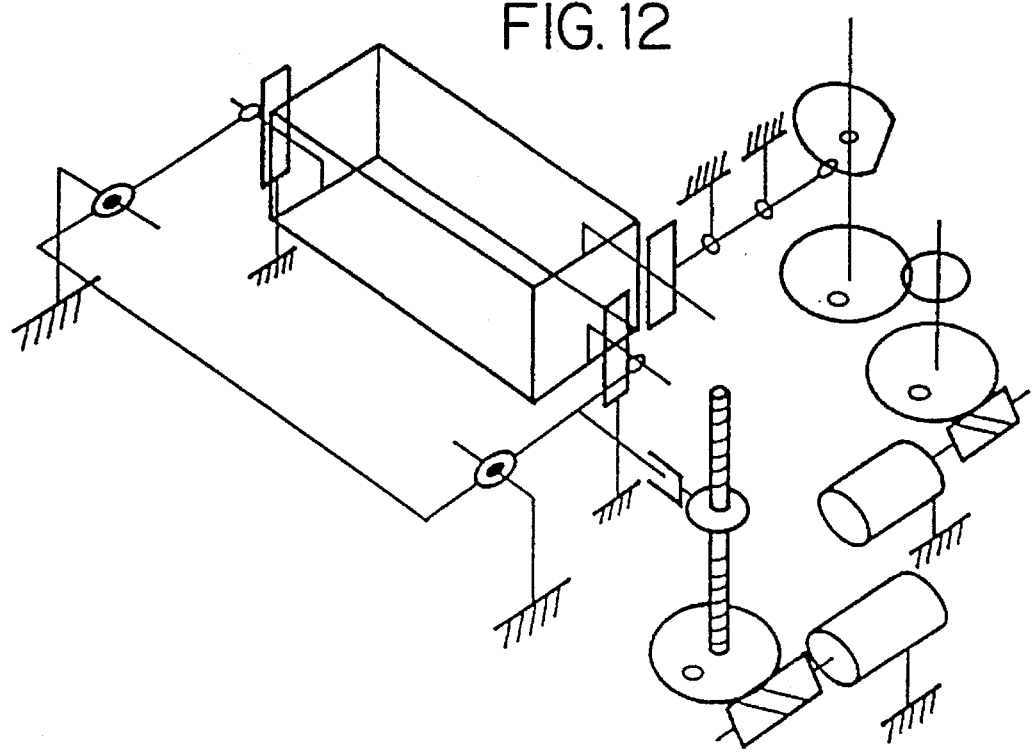
FIG. 12 is a mechanism conceptual view showing the motion displayed by the first embodiment of the mechanism conceptual drawing operation display apparatus.
Figure 13:
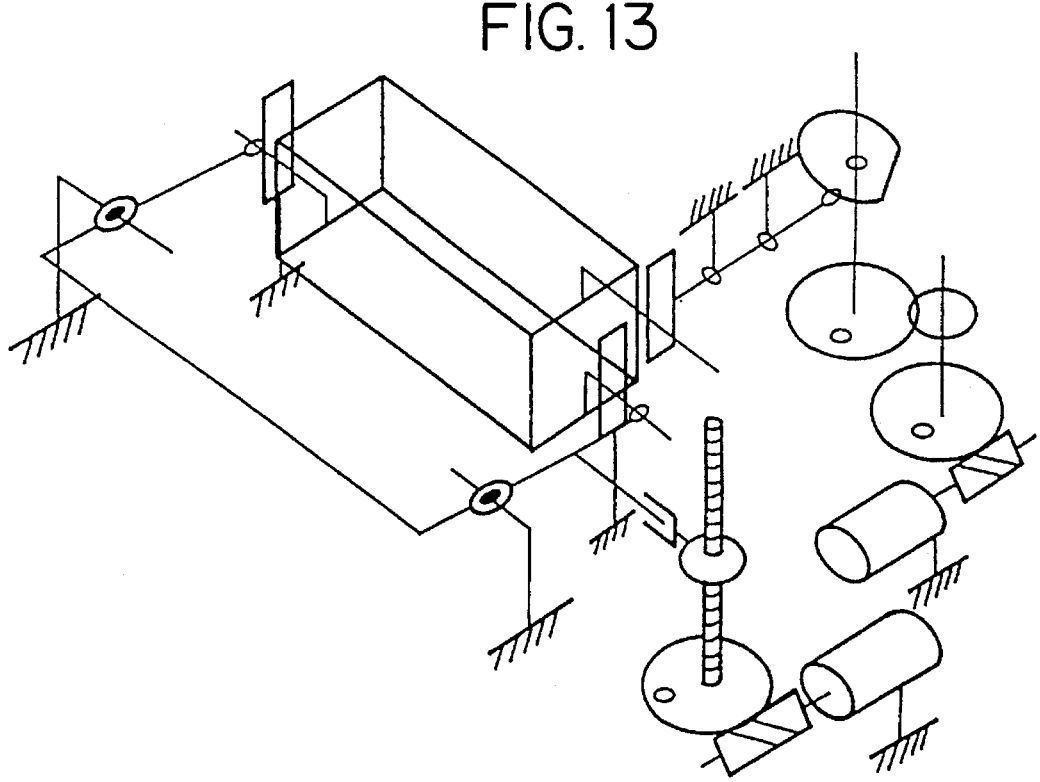
FIG. 13 is a mechanism conceptual view showing the motion displayed by the first embodiment of the mechanism conceptual drawing operation display apparatus.
Figure 14:
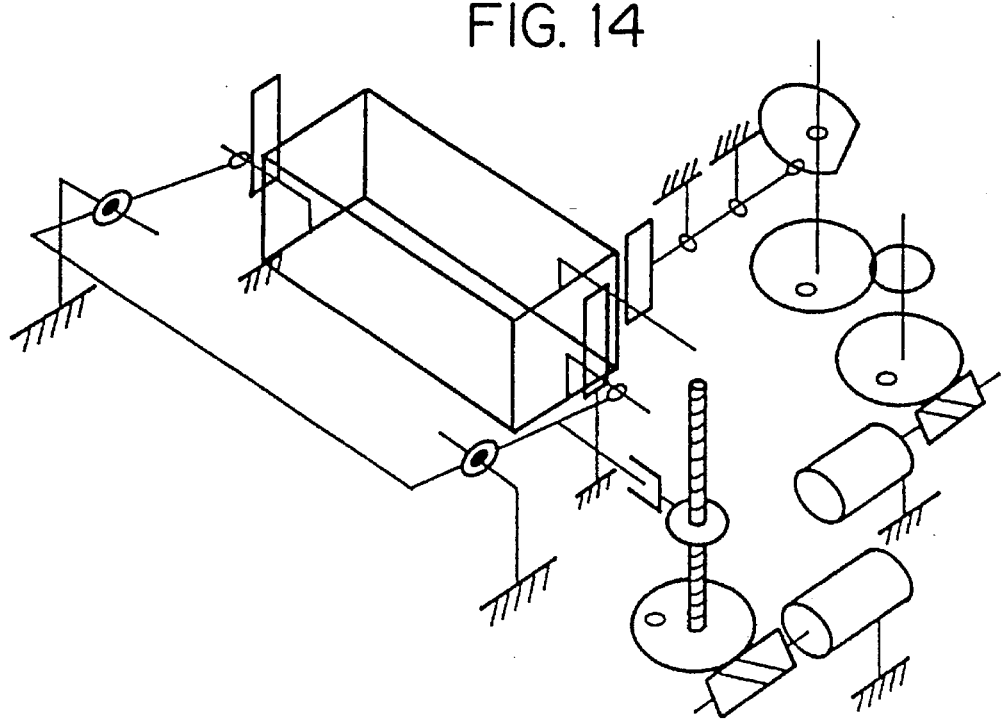
FIG. 14 is a mechanism conceptual view showing the motion displayed by the first embodiment of the mechanism conceptual drawing operation display apparatus.
Figure 15:
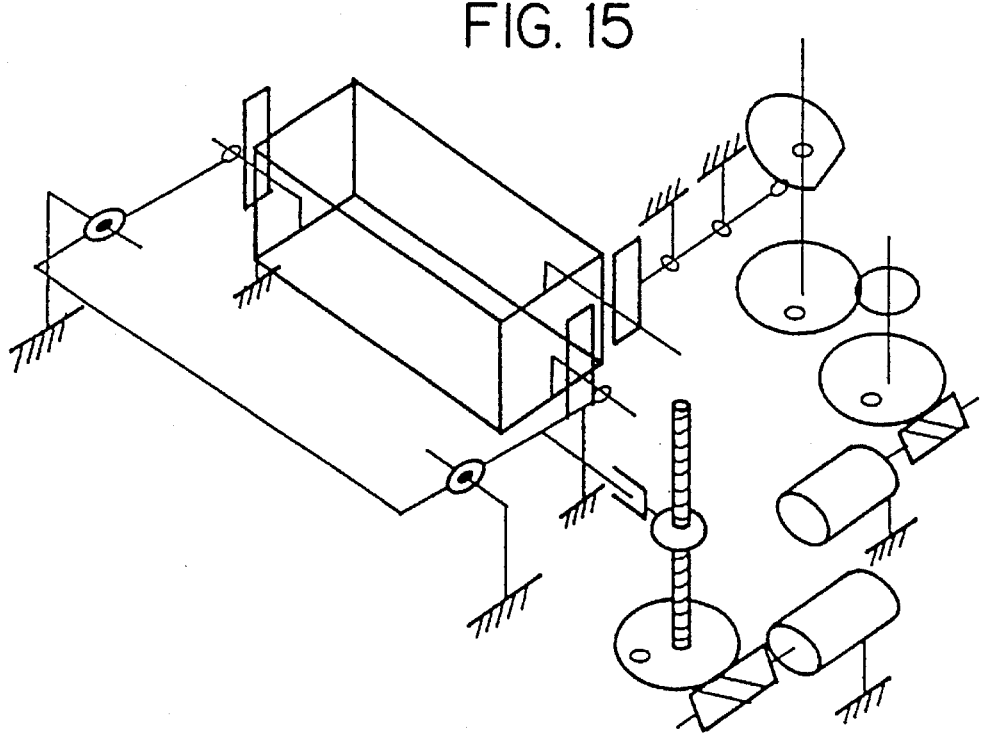
FIG. 15 is a mechanism conceptual view showing the motion displayed by the first embodiment of the mechanism conceptual drawing operation display apparatus.
Figure 16:
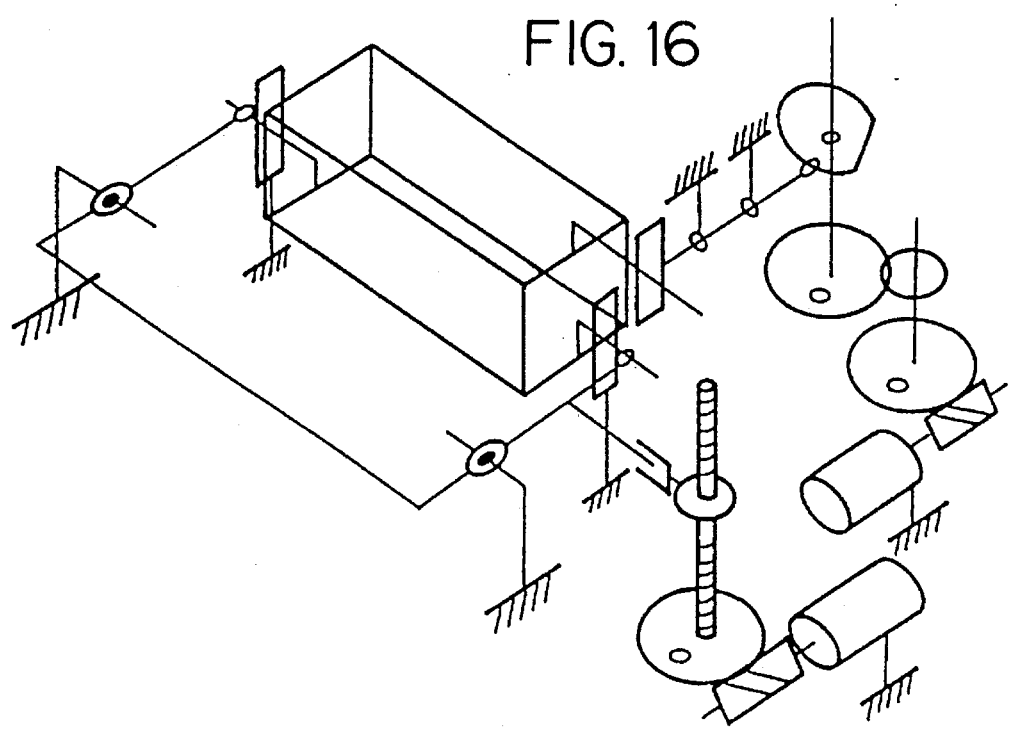
FIG. 16 is a mechanism conceptual view showing the motion displayed by the first embodiment of the mechanism conceptual drawing operation display apparatus.
Figure 17:
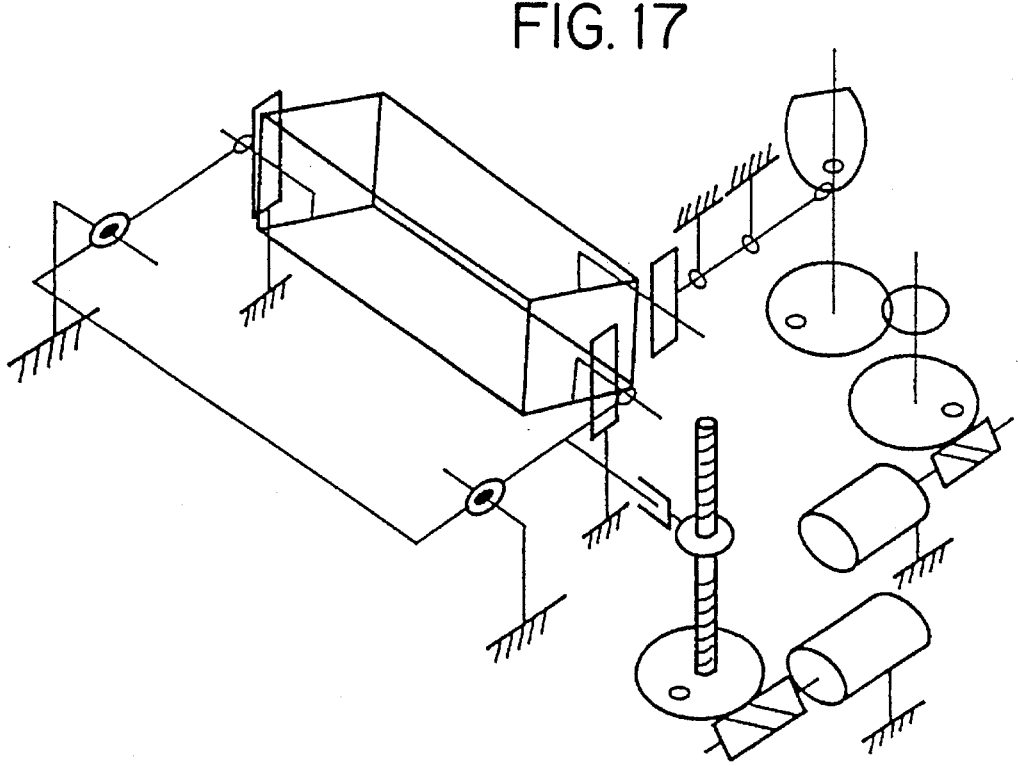
FIG. 17 is a mechanism conceptual view showing the motion displayed by the first embodiment of the mechanism conceptual drawing operation display apparatus.
Figure 18:
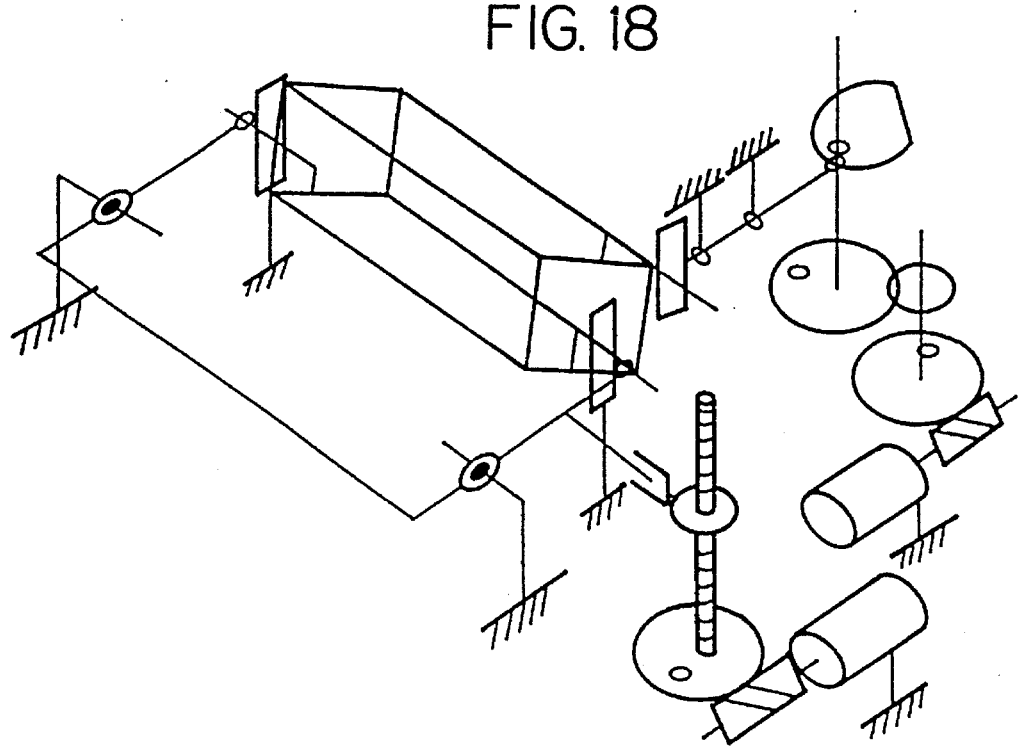
FIG. 18 is a mechanism conceptual view showing the motion displayed by the first embodiment of the mechanism conceptual drawing operation display apparatus.
Figure 19:
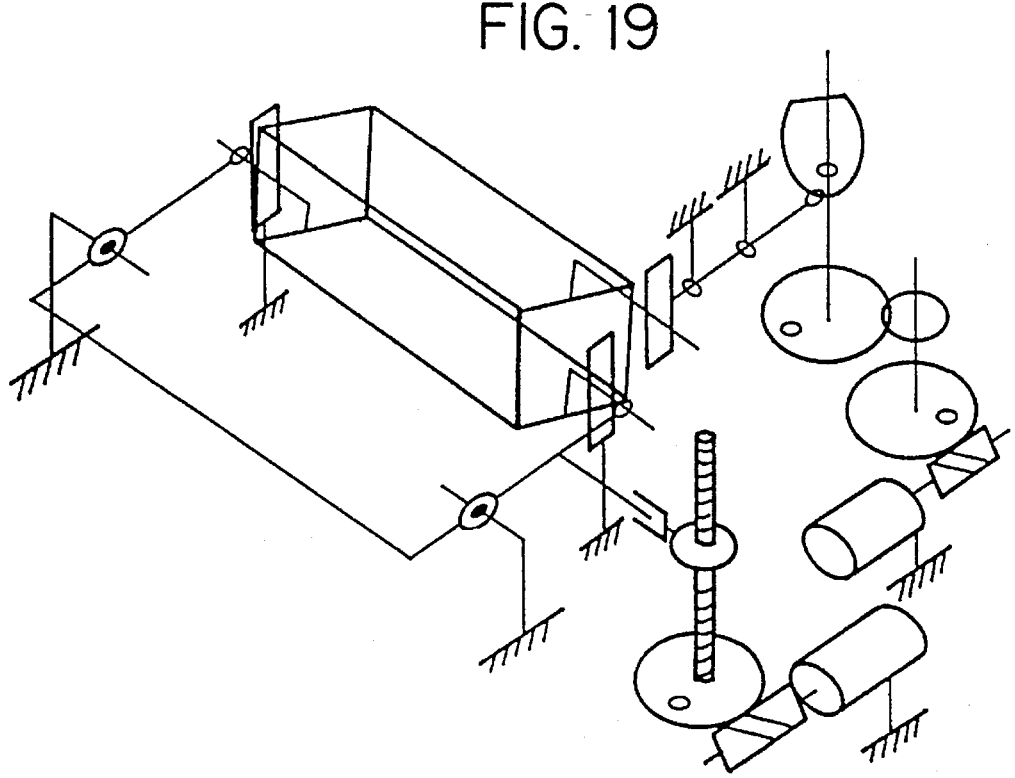
FIG. 19 is a mechanism conceptual view showing the motion displayed by the first embodiment of the mechanism conceptual drawing operation display apparatus.
Figure 20:
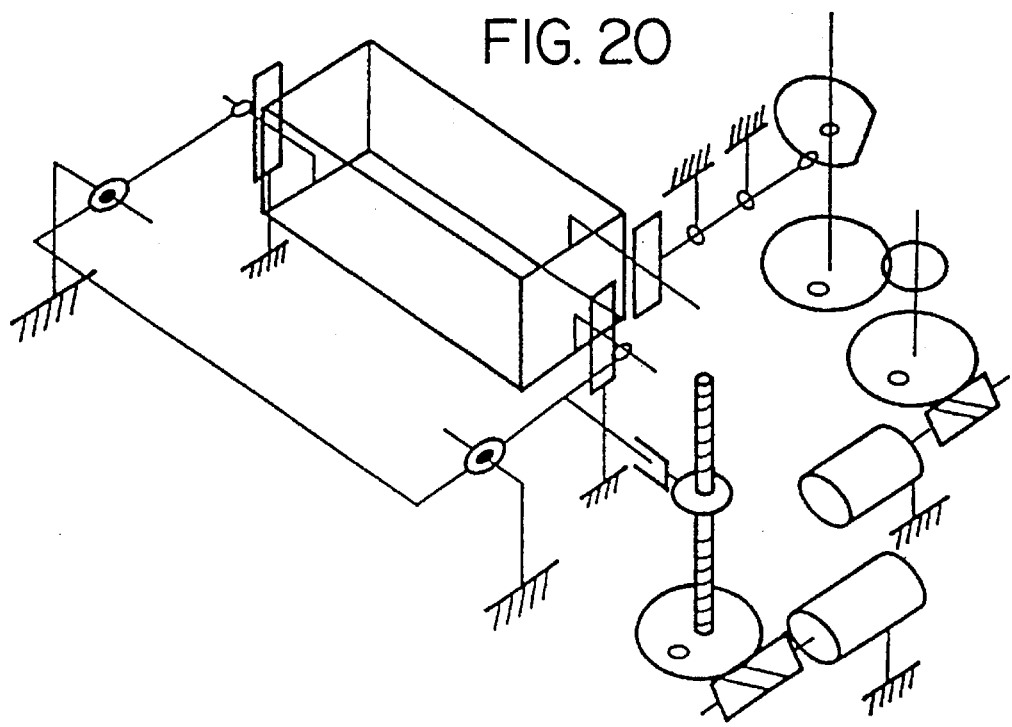
FIG. 20 is a mechanism conceptual view showing the motion displayed by the first embodiment of the mechanism conceptual drawing operation display apparatus.
Figure 21:
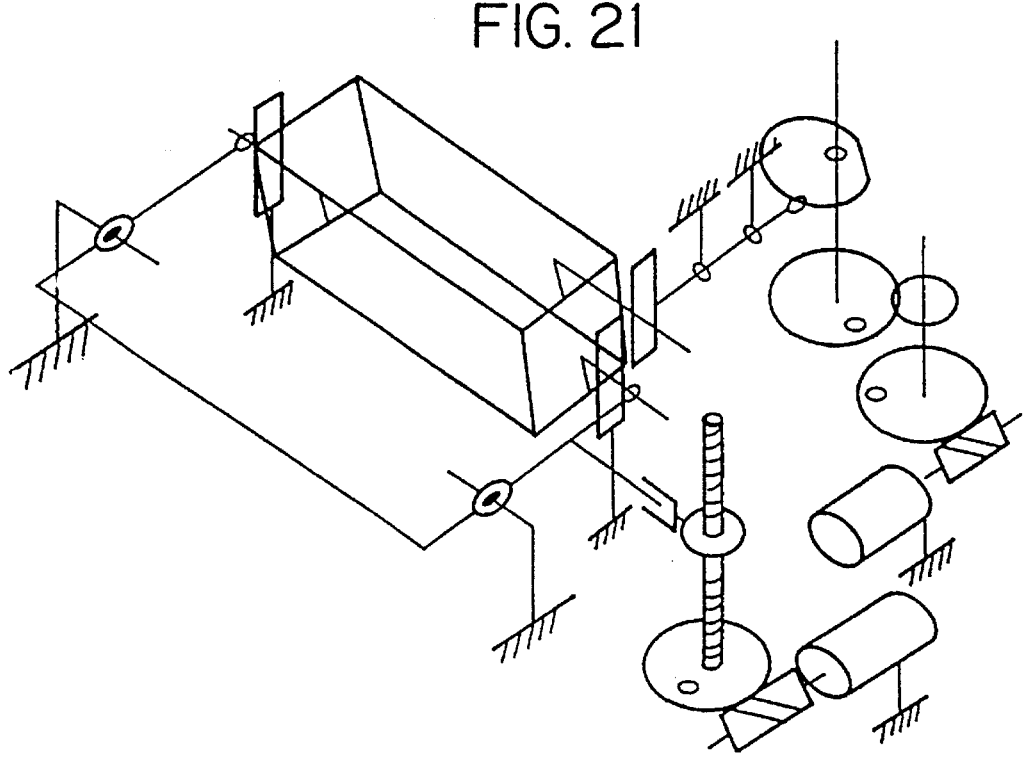
FIG. 21 is a mechanism conceptual view showing the motion displayed by the first embodiment of the mechanism conceptual drawing operation display apparatus.
Figure 22:
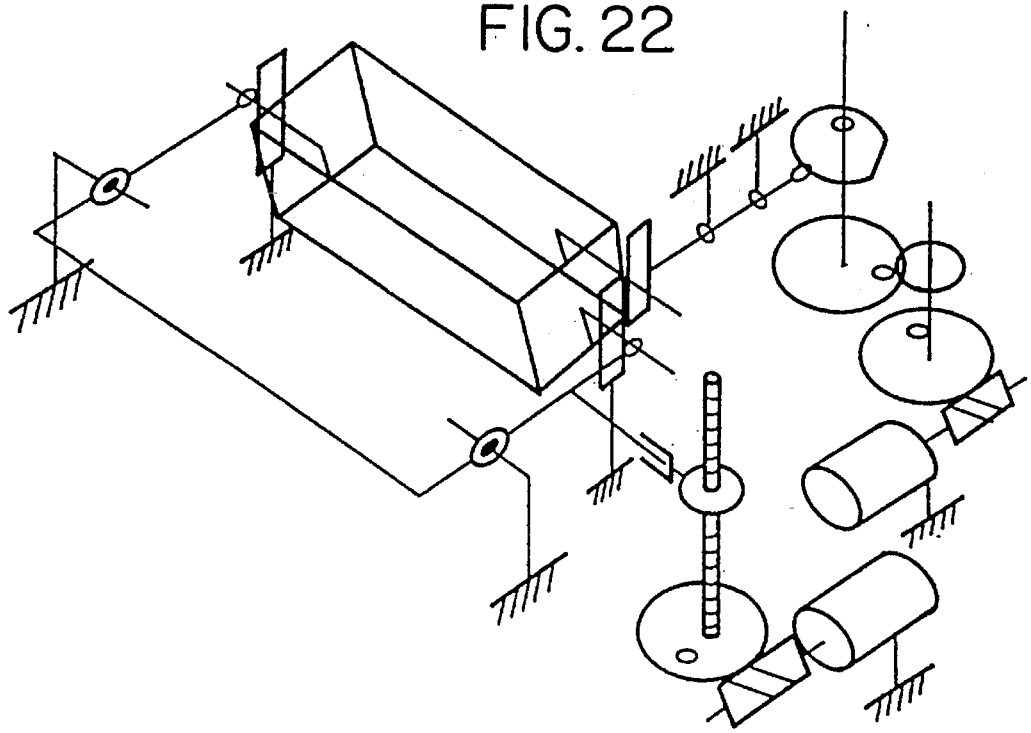
FIG. 22 is a mechanism conceptual view showing the motion displayed by the first embodiment of the mechanism conceptual drawing operation display apparatus.
Figure 23:
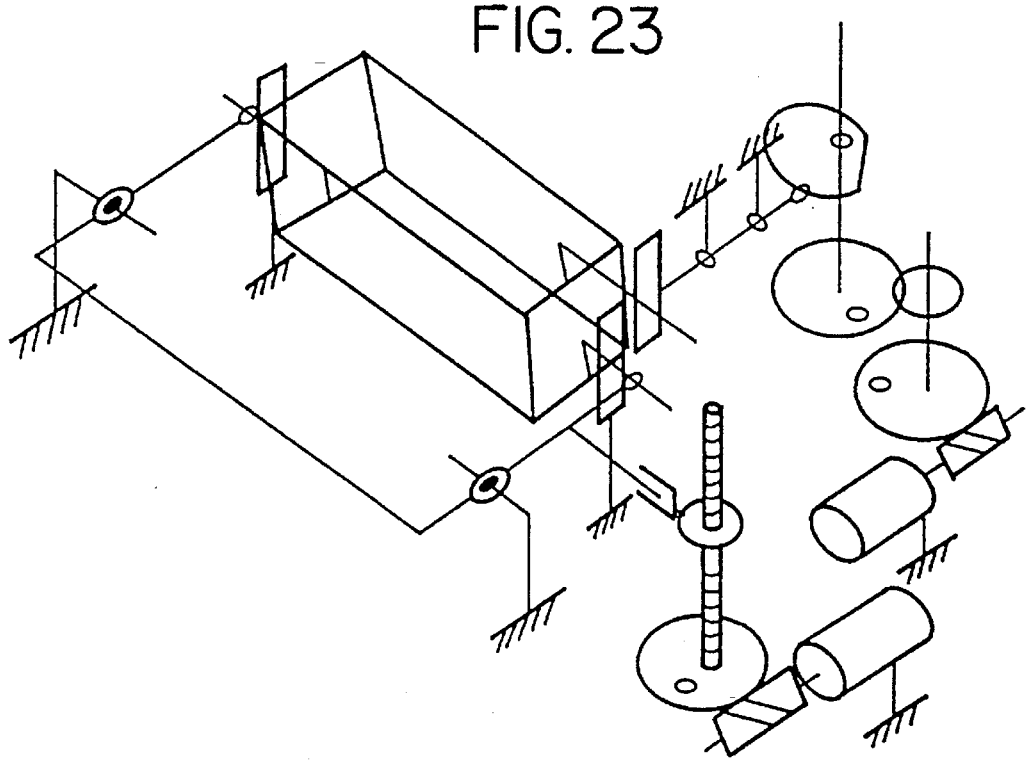
FIG. 23 is a mechanism conceptual view showing the motion displayed by the first embodiment of the mechanism conceptual drawing operation display apparatus.
Figure 24:
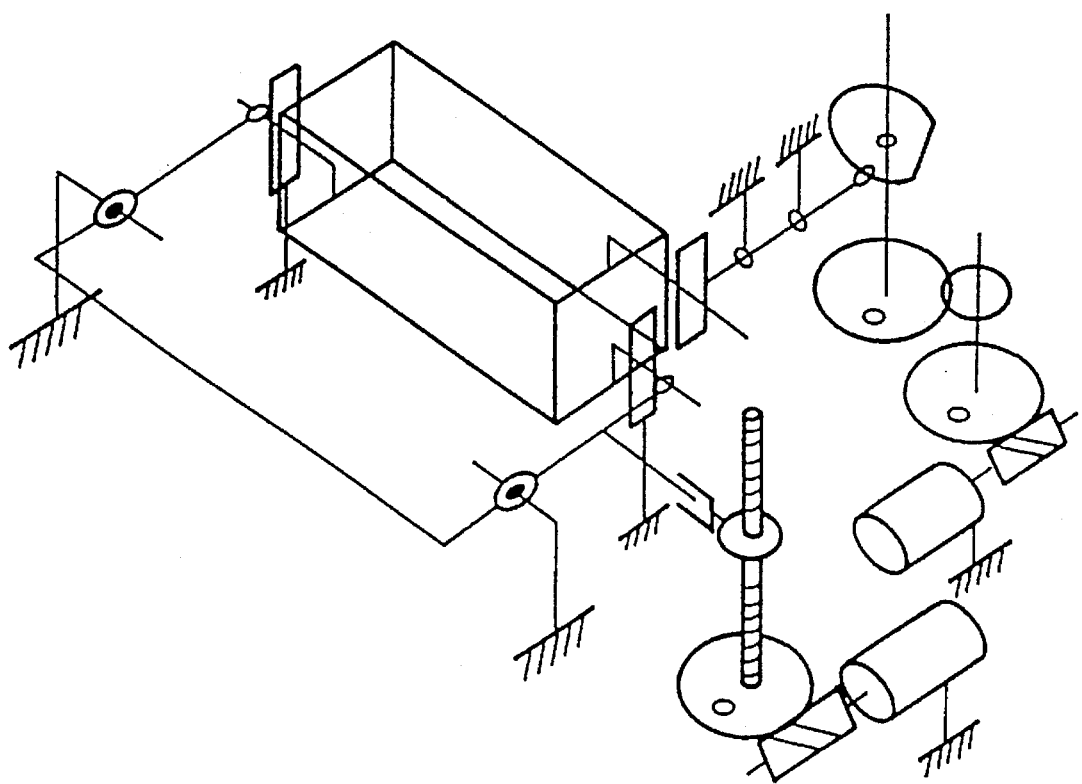
FIG. 24 is a mechanism conceptual view showing the motion displayed by the first embodiment of the mechanism conceptual drawing operation display apparatus.
Figure 25:
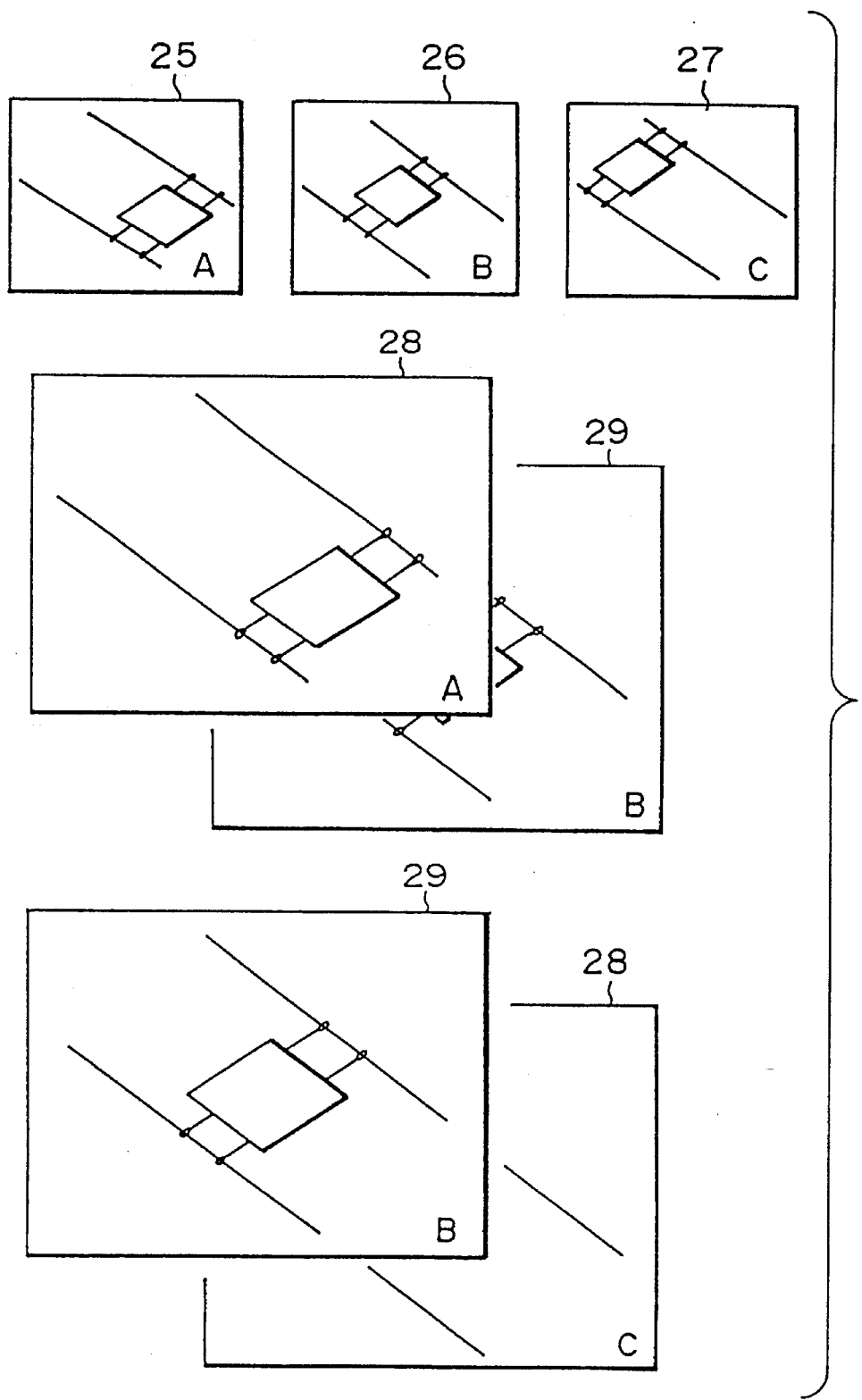
FIG. 25 is an explanatory view of a method for dynamically displaying a mechanism conceptual view in the first embodiment.

Next, the movable parts and the fixed parts are separated from each other by the separation means 8, as shown in FIG. 4 and FIG. 7.

Then, non-rotary movable parts are moved by the moving means 9. Also, rotary movable parts are rotated by the rotating means 10.

Next, the moved and rotated parts and the fixed parts are synthesized by the synthesis means 11 to form a figure. Further, a mechanism conceptual view every time is displayed by the dynamic display means 12. As this example, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23 and FIG. 24 are the conceptual views showing the results of the above-described synthesis executed at a plurality of timings in synchronism with a dynamic sequence.

The dynamic display means 12 displays the conceptual views of states 25, 26 and 27 by using display memories 28 and 29. That is, first, the conceptual view of the state 25 is stored in the display memory 28 and is displayed on the CRT or the like. At this time, the conceptual view of the state 26 is written into the non-displayed memory 29. At the time when the writing is finished, the display states of the display memories 28 and 29 are switched. Thus, in a moment, the content in the memory 29 is displayed and the memory 28 becomes the non-displayed memory. Then, the conceptual view of the state 27 is written into the memory 28, and the above-described operation is repeated.

Further, in the plural state view display means 13, FIG. 8 to FIG. 24 can be displayed on one screen as an operational process chart.

Figure 26:
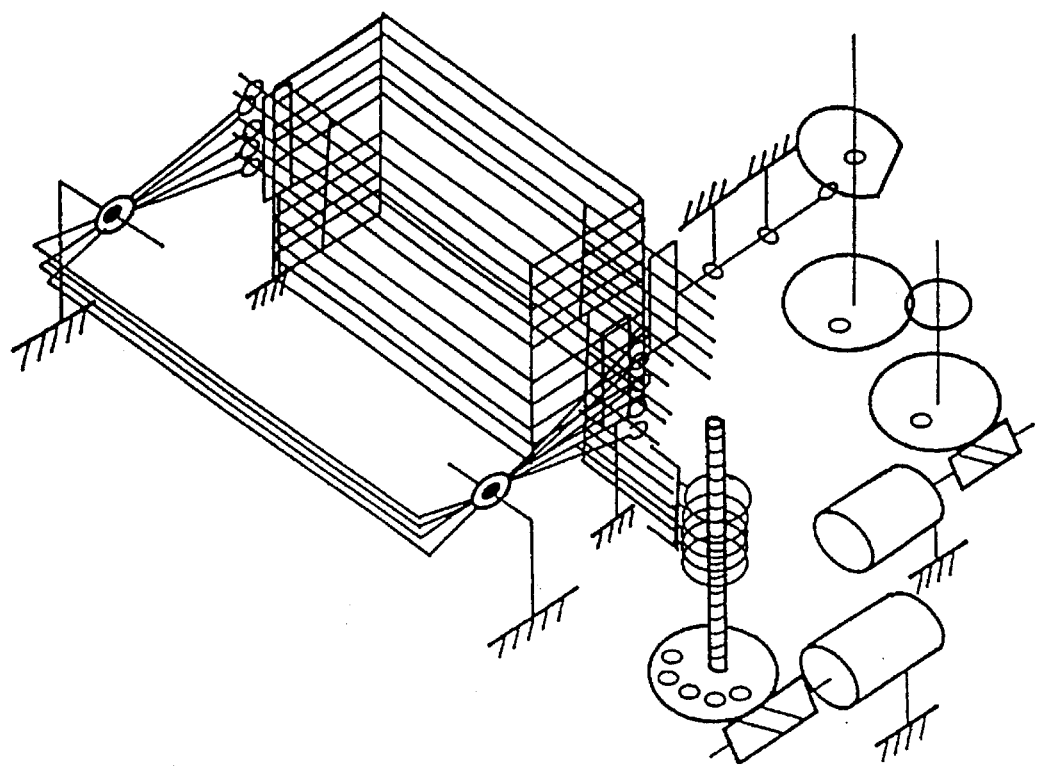
FIG. 26 is a mechanism conceptual view showing the overlapped motions displayed by the first embodiment of the mechanism conceptual drawing operation display apparatus.
Figure 27:
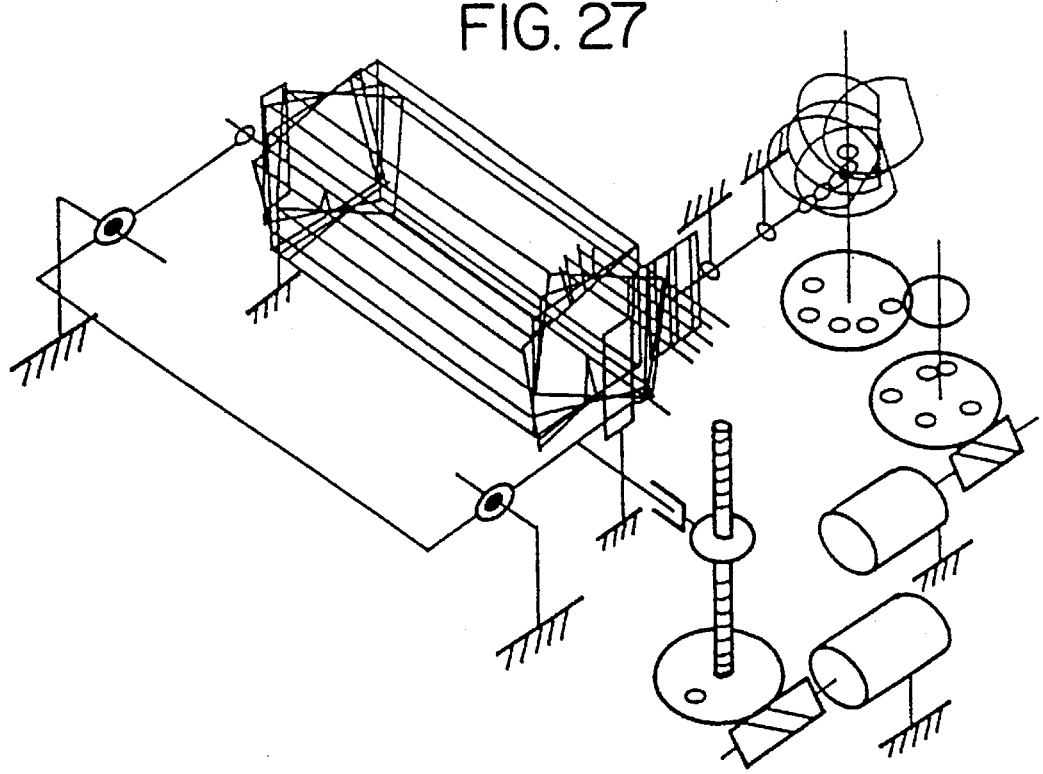
FIG. 27 is a mechanism conceptual view showing the overlapped motions displayed by the first embodiment of the mechanism conceptual drawing operation display apparatus.

Also, in the overlap display means 14, the motion parts can be overlapped to display the mechanism conceptual view, as shown in FIG. 26 or FIG. 27.

A series of these means can be executed by the arithmetic unit 1 composed of the integrated circuit or the like, the memory unit 2 composed of the integrated circuit or the like, the auxiliary memory unit 3 composed of the magnetic recording device or the like, the display unit 4 composed of the CRT or the like, the drawing formation unit 5 composed of the plotter or the like, and the input unit 6 composed of the coordinate position indicating device and the key board.

The second embodiment

Now, the second embodiment of a mechanism conceptual drawing operation display apparatus according to the present invention will be described in detail with reference to the accompanying drawings.

Figure 28:
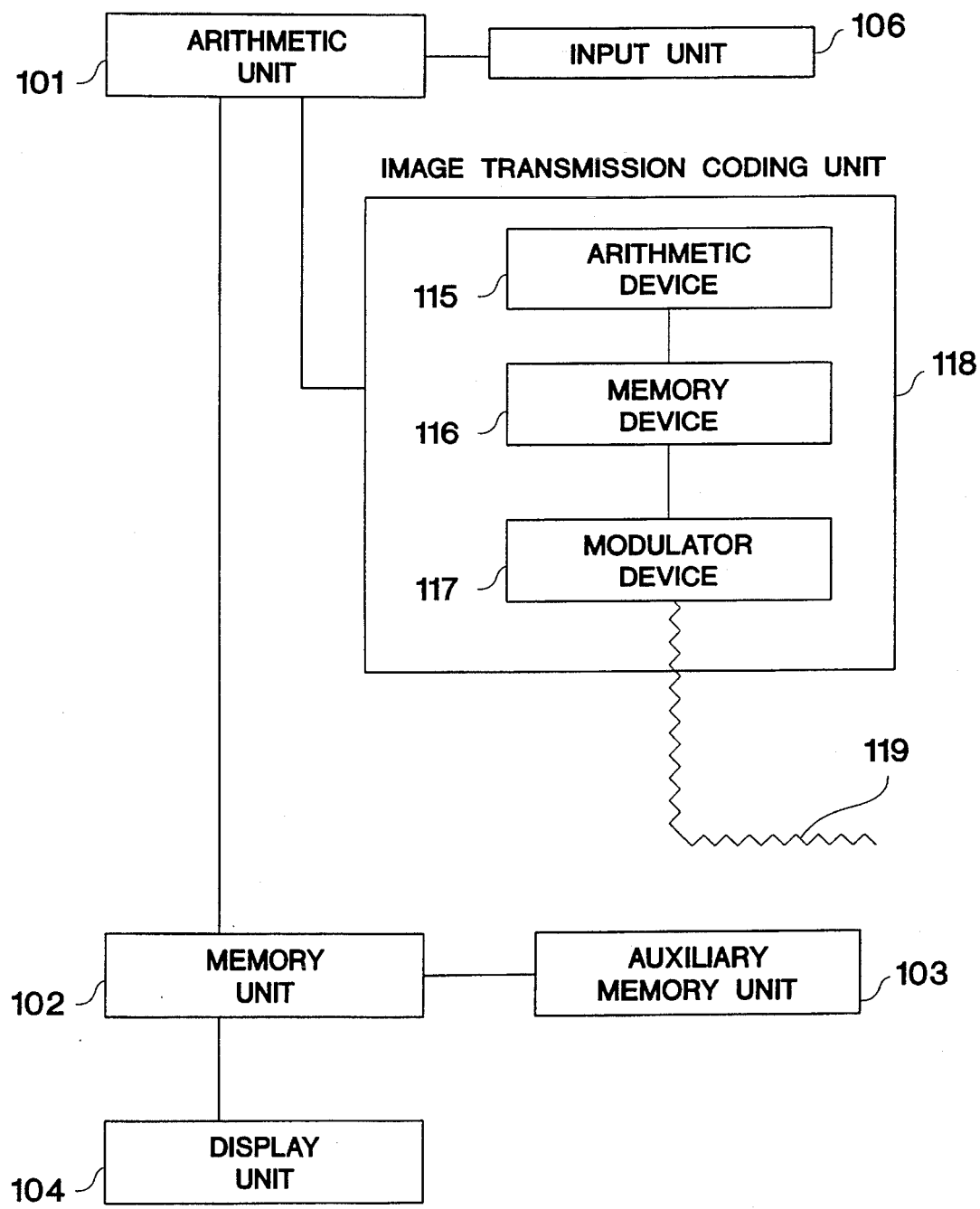
FIG. 28 is a block diagram of a second embodiment of a mechanism conceptual drawing operation display apparatus according to the present invention.

In FIG. 28, the mechanism conceptual drawing operation display apparatus includes an arithmetic unit 101 composed of an integrated circuit or the like, a memory unit 102 composed of an integrated circuit or the like, an auxiliary memory unit 103 composed of a magnetic recording device or the like, a display unit 104 composed of a CRT or the like, an input unit 106 composed of a coordinate position indicating device and a key board, and an image transmission coding unit 118 for transmitting conceptual views via a telephone line. The image transmission coding unit 118 includes an arithmetic device 115, a memory device 116 and a modulator device 117 connected to a telephone line 119 to be coupled with a facsimile on a receiver side.

Figure 29:
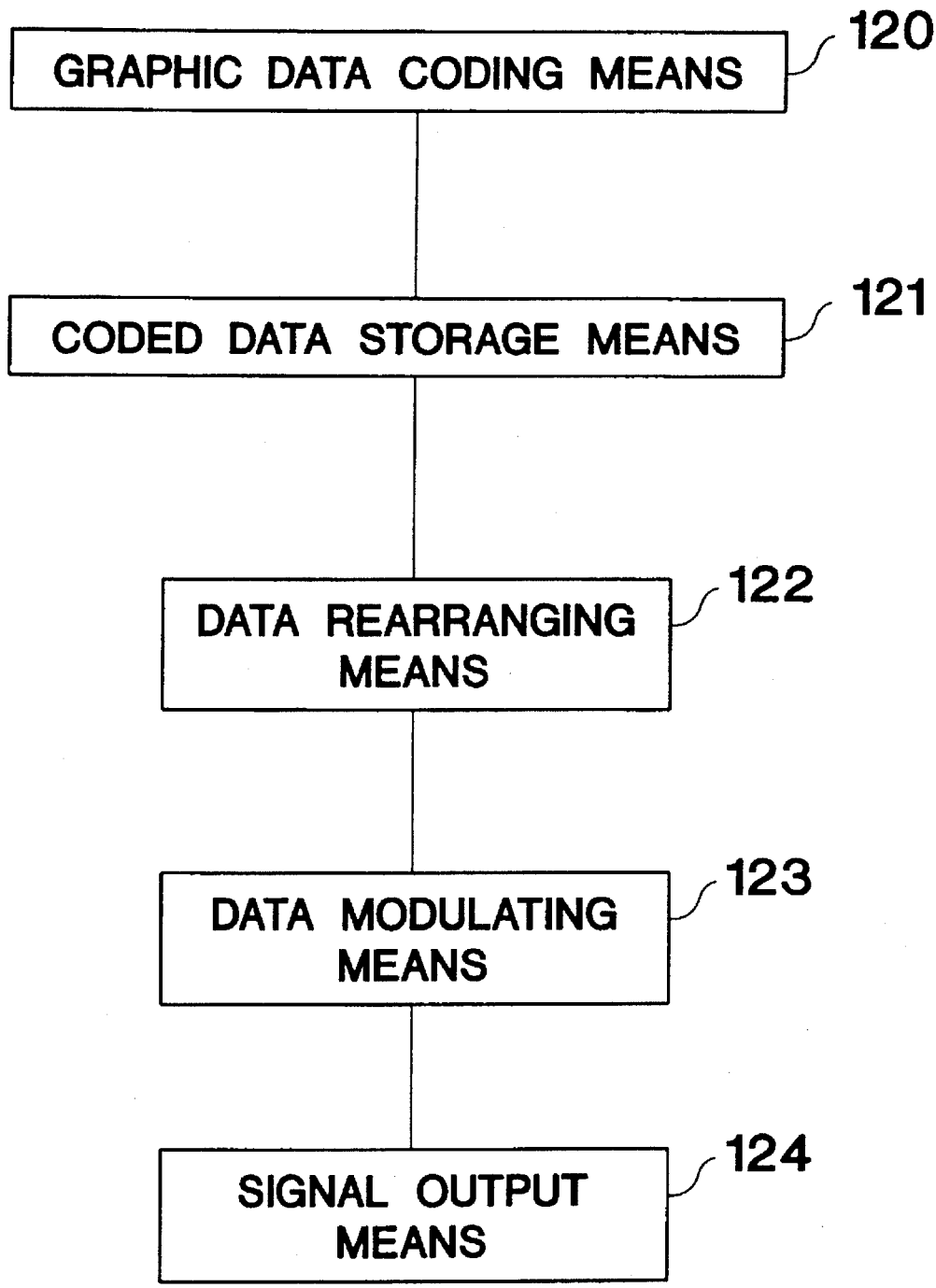
FIG. 29 is a block diagram of a second embodiment of a mechanism conceptual drawing operation display means according to the present invention.

FIG. 29 further shows detailed functional means of the second embodiment, which includes an image data coding means 120 for coding image data on the basis of conceptual view data formed by the mechanism conceptual view formation apparatus for expressing the operation of the machine, a coded data storage means 121, a stored data rearranging means 122, a data modulating means 123 for modulating the data into sound signals, and a signal output means 124 for outputting the signals to the telephone line.

Next, the operation of the second embodiment will now be described. First, since the data of the conceptual views formed are binary data of "0" and "1", the data are coded by MH codes of a compressed format of the binary data. This is a general coding method of a facsimile transmission. That is, the numbers of "0" and "1" every one line are calculated, and the obtained numbers are replaced by previously prepared codes. This processing is performed by the image data coding means 120. This is executed by the arithmetic unit 101, the memory unit 102 and the auxiliary memory unit 103.

Next, the coded data are stored in the coded data storage means 121. This is carried out in the memory device 116 of the image transmission coding unit 118.

Then, the order of the data is rearranged in the data rearranging means 122 so as to adapt to a protocol of the facsimile. This is carried out in the arithmetic device 115 and the memory device 116.

Next, in the data modulating means 123, the rearranged data are modulated to obtain the sound signals. Further, the sound signals are output by the signal output means 124. This is performed in the modulator device 117, and the conceptual view is transmitted to the facsimile on the receiver side via the telephone line 119.

Figure 30:
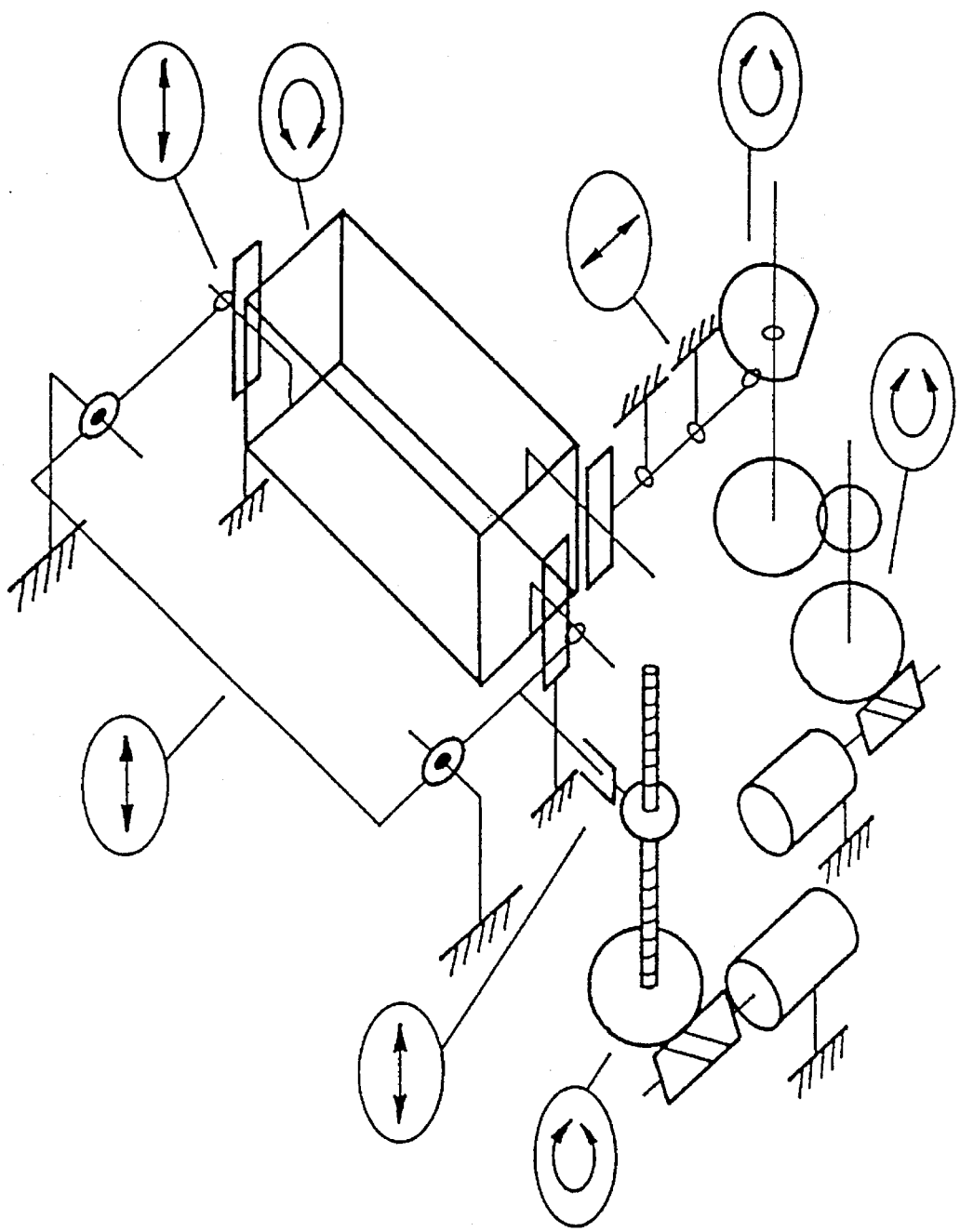
FIG. 30 is a mechanism conceptual view transmitted from the second embodiment of the mechanism conceptual drawing operation displaying apparatus to a facsimile.
Figure 31:
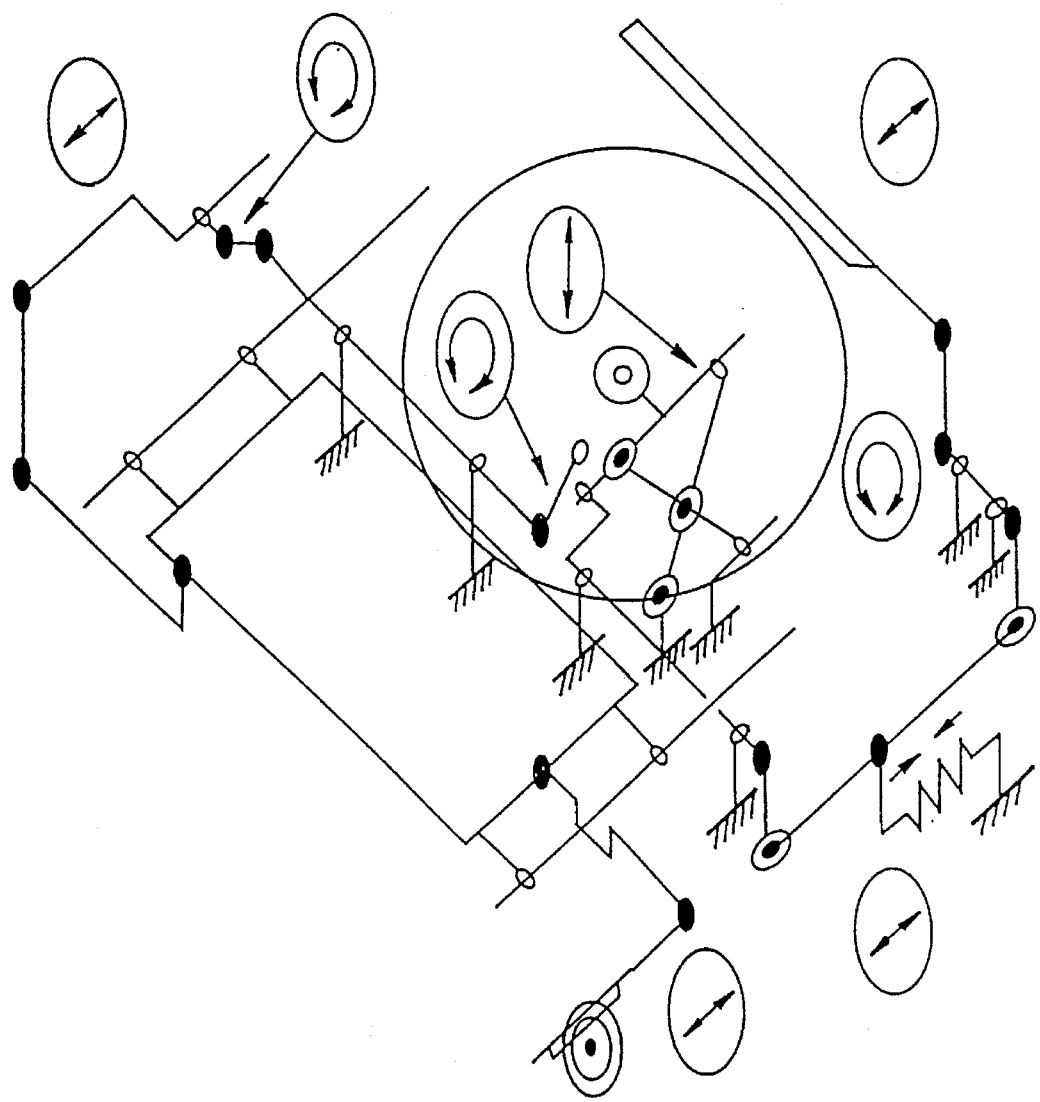
FIG. 31 is a mechanism conceptual view transmitted from the second embodiment of the mechanism conceptual drawing operation display apparatus to the facsimile.

The conceptual views transmitted in this manner are shown in FIG. 30 and FIG. 31.

The third embodiment

Figure 32:
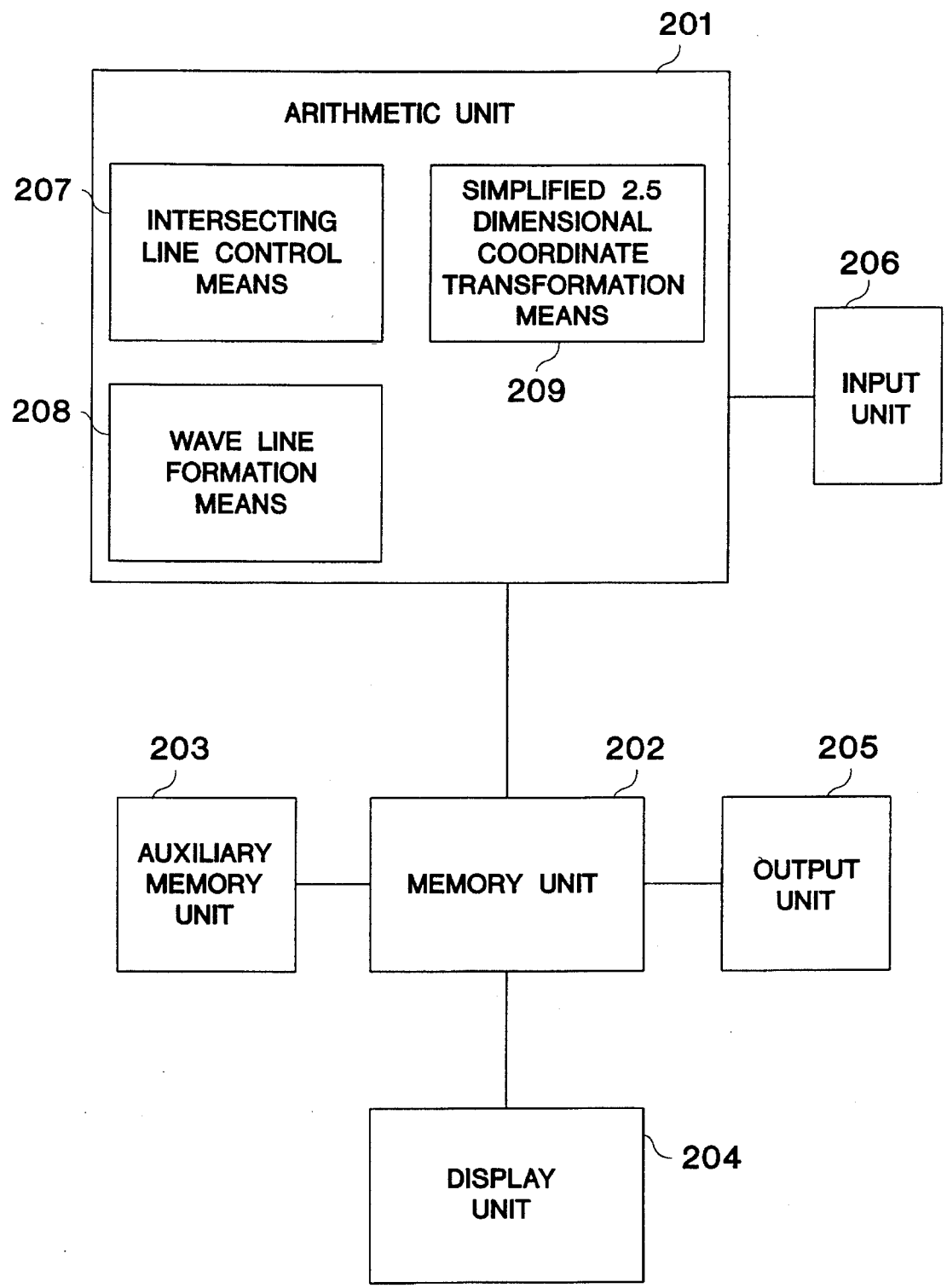
FIG. 32 is a block diagram showing the third, fourth and fifth embodiments of the mechanism conceptual drawing operation display apparatus according to the present invention.

Next, the third embodiment of a mechanism conceptual drawing operation display apparatus according to the present invention will be described in detail with reference to the accompanying drawings. In FIG. 32, the mechanism conceptual drawing operation display apparatus is comprised of an arithmetic unit 201 composed of an integrated circuit or the like, a memory unit 202 composed of an integrated circuit or the like, an auxiliary memory unit 203 composed of a magnetic recording device or the like, a display unit 204 composed of a CRT or the like, an output unit 205 composed of a plotter or the like, and an input unit 206 composed of a coordinate position indicating device and a key board, and the arithmetic unit 201 includes an intersecting line control means 207, a wave line formation means 208 and a simplified 2.5 dimensional coordinate transformation means 209.

Figure 33:
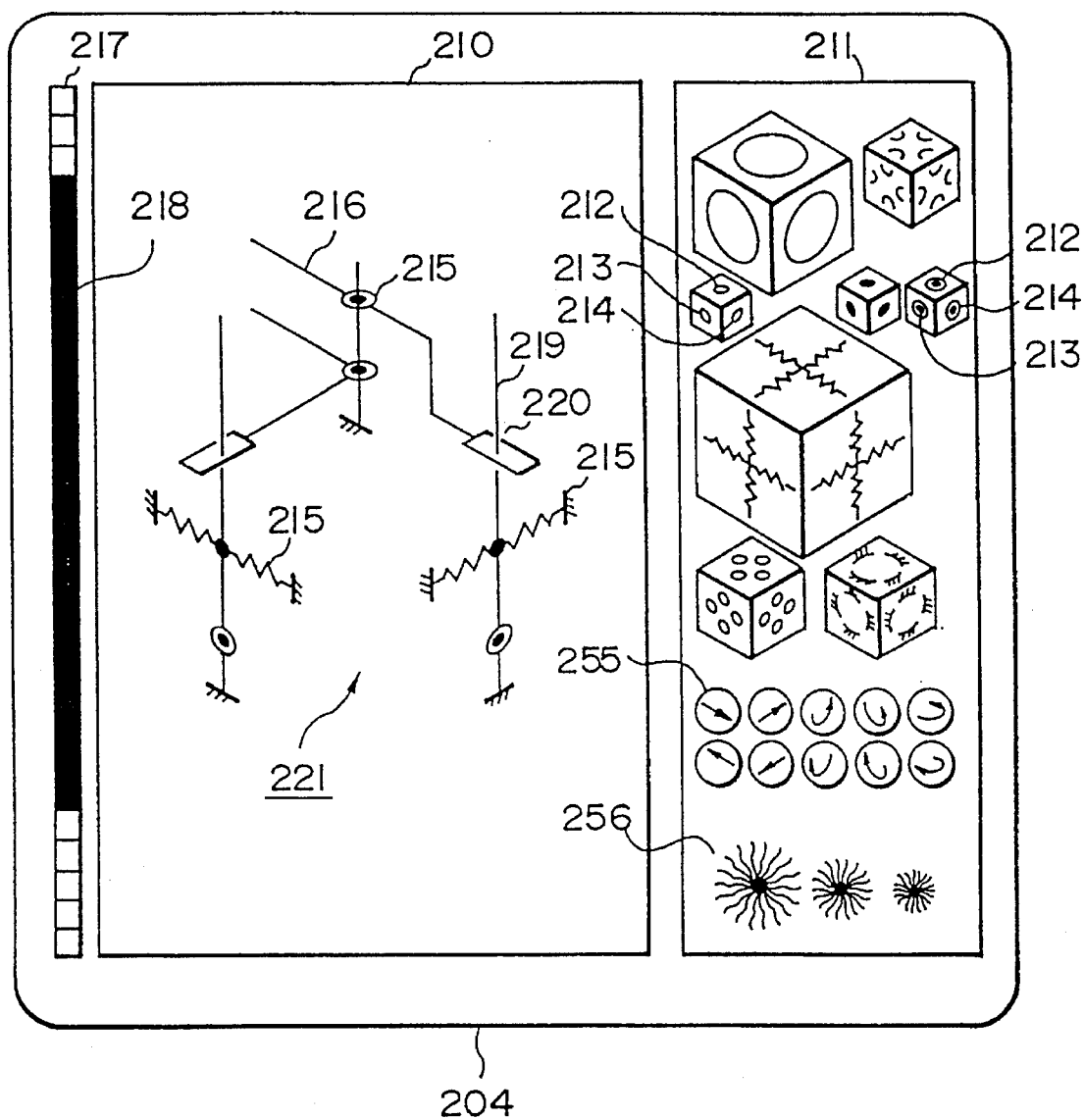
FIG. 33 is an elevational view showing one example of a mechanism conceptual view drawn by a skeleton perspective drawing method, displayed on a display device in the third embodiment of the present invention.

FIG. 33 shows a diagram displayed within a screen of the display unit 204, the diagram illustrating an image form produced by a skeleton perspective drawing method, which includes a drawing formation area 210 of a mechanism conceptual view, a selection area 211 arranged neighboring the drawing formation area 210, and first, second and third view points of symbol menus 212, 213 and 214 which are displayed in the selection area 211 and are used for drawing a picture by the orthographic projection method and which represent symbols seen from different angles of a perspective view. The drawing formation area 210 includes symbol elements 215 and mechanism elements 216. A marking area 217 having a marker 218 therein is arranged on the left hand side of the drawing formation area 210. The drawing formation area 210 also includes intersecting lines 219 and division parts 220 produced by the intersecting lines 219. The symbol elements 215, the mechanism elements 216, the intersecting lines 219 and the division parts 220 constitute a mechanism conceptual view 221.

Next, the operation of the third embodiment will now be described. In FIG. 33, when the mechanism conceptual view is formed, first, one of the symbol elements 215 displayed in the selection area 211 is selected by the input unit 206 shown in FIG. 32. Then, any one point in the drawing formation area 210 is indicated by the input unit 206. Thus, by the arithmetic unit 201 and the memory unit 202, the selected symbol element 215 is arranged around the indicated point in the display unit 204 with the same angle as the arranged angle in the selection area 211. This operation is repeated to arrange a plurality of symbol elements 215 within the drawing formation area 210, and then solid lines are drawn to connect the symbol elements 215 by the input unit 206 so as to obtain the same construction as the mechanism construction to be expressed. As a result, a mechanism conceptual view 221 is drawn.

Figure 34:
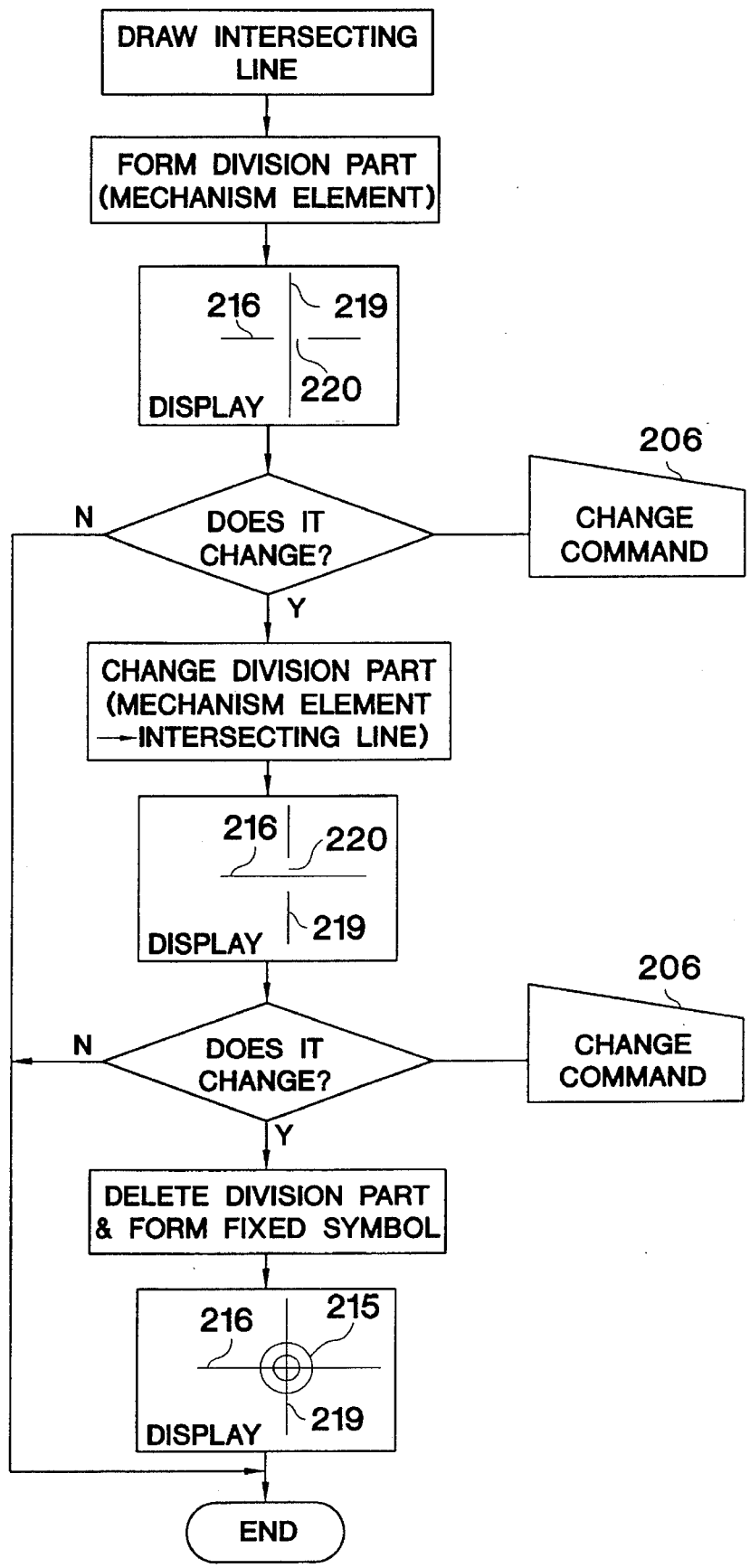
FIG. 34 is a flow chart showing a process of an intersecting line control means of an arithmetic unit of the third embodiment of the present invention.

In the middle of the drawing, when the intersecting lines 219 crossing with the mechanism elements 216 already drawn are drawn, the intersecting line control means 207 of the arithmetic unit 201 is operated, as shown in FIG. 34. That is, first, the intersecting line control means 207 gives a division part 220 of a predetermined length around an intersecting point of the mechanism element 216 previously drawn and the intersecting line 219. As a result, it is expressed that the latter line 219 is positioned over the former line 216. On the other hand, when the divided mechanism element 216 is positioned on the upper paper surface than the intersecting line 219 crossing with the mechanism element 216 from the structural point of view of the machine, a change command of the division part 220 is input from the input unit 206. Hence, the intersecting line control means 207 forms the division part 220 on the intersecting line 219 drawn later and deletes the division part of the mechanism element 216. Also, when the previously drawn mechanism element 216 and the lately drawn intersecting line 219 are constructed in the same plane, by inputting the change command again from the input unit 206, the intersecting line control means 207 further deletes the division part 220 from the intersecting line 219 to form the symbol element 215 exhibiting the meaning of the fixing at the intersecting point.

Next, a range in the vertical direction of the screen in the area where the drawn mechanism conceptual view 221 is arranged is indicated by the input unit 206, the range of almost the same area as the vertical area indicated by the arithmetic unit 201 is recognized to form the marker 218 in the marking area 217 shown in FIG. 33. When the drawn mechanism conceptual view is output on a paper or the like, the mechanism conceptual view 221 to be output is selected and indicated by the input unit 206. Thus, the output unit 205 outputs the selected mechanism conceptual view 221 and the marker 218 as the image form at the same time. In the output mechanism conceptual view, only the range indicated by the marker 218 in the vertical direction can be coded to obtain image data by an image reader such as a scanner or the like.

The fourth embodiment

Figure 35:
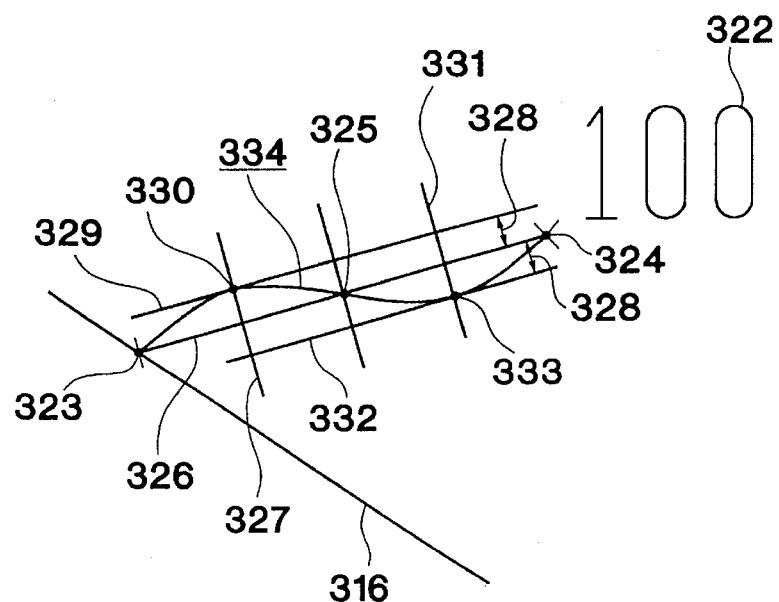
FIG. 35 is an elevational view showing a part of a mechanism conceptual view drawn by using a leading wave line formation means of an arithmetic unit of the fourth embodiment of the present invention.

When a sign or code is attached to a drawn mechanism element 316 to correspond to a name of the mechanism element 316, it is necessary to couple the mechanism element 316 to be pointed with its number by using a leader line. It is considered that the form of the leader line is preferably a wave line form so as not to understand the drawing even when the leader line intersects with other mechanism elements. As shown in FIG. 35, the leader line of the wave line form is drawn in the drawing formation area 210 as follows. That is, first, by the input unit 206, a code 322 such as "100" is input and arranged near the mechanism element 316 to be pointed, and a leading start point 323 at any one point on the mechanism element 316 and the code 322 are selectively indicated by the input unit 206. Then, in the arithmetic unit 201, a straight line distance between the leading start point 323 and a neighbor point 324 directing the arrangement center of the code 322 is calculated by the leading wave line formation means 208, and the obtained distance is divided into two equal parts to recognize a middle point 325 between the leading start point 323 and the neighbor point 324. A parallel line 329 parallel with an imaginary straight line 326 passing through the leading start point 323 and the neighbor point 324 at a distance of a wave height 328 previously stored in the memory unit 202 is considered. A division line 327 passing through the leading start point 323 and the middle point 325 perpendicular to the imaginary straight line 326 is assumed, and an intersecting point 330 crossing the imaginary straight line 326 and the parallel line 329 is recognized. Similarly, another parallel line 332 on the opposite side to the parallel line 329 and another division line 331 between the neighbor point 324 and the middle point 325 are considered and another intersecting point 333 crossing the division line 331 and the parallel line 332 is recognized. In the arithmetic unit 201, a free-form curve passing through the leading start point 323, the intersecting point 330, the middle point 325, the intersecting point 333 and the neighbor point 324 in order is formed by using a spline interpolation function to draw a leading wave line 334.

The fifth embodiment

Figure 36:
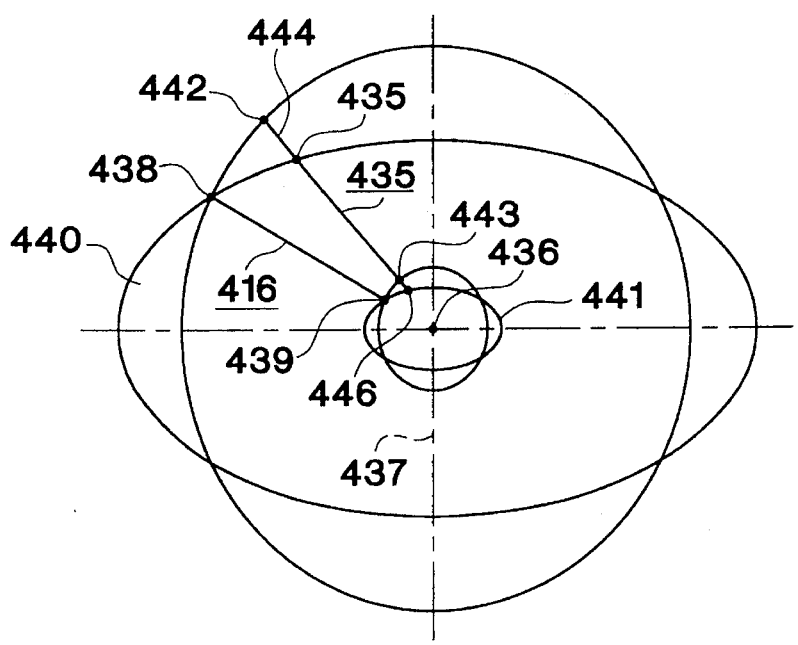
FIG. 36 is an elevational view showing a mechanism conceptual view drawn by a skeleton perspective drawing method in the fifth embodiment of the present invention.

When an operation of a mechanism element 416 drawn in the display unit 204 is displayed in a mechanism conceptual view 221, it is shown by drawing the mechanism element 416 before the motion and a mechanism element 435 after the motion side by side or overlapping the same. For example, as shown in FIG. 36, when the mechanism element 435 after the motion is drawn by citing the mechanism element 416 before the motion, which is already drawn in the drawing formation area 210 by the skeleton perspective drawing method, the mechanism element 416, a rotational center 436, a rotational axis 437, a rotating direction and a rotating angle are selectively indicated in order by the input unit 206. Then, in the arithmetic unit 201, assuming that there are two ellipses having the center of the rotary center 436, crossing the rotational axis 437 and passing through both the ends 438 and 439 of the line segment of the mechanism element 416 and their diameters at a slant angle of 30° with respect to the horizontal direction is one, two imaginary ellipses 440 and 441 having isometric elliptic forms at a ratio of a long diameter of 1.22 to a short diameter of 0.7 are recognized by the simplified 2.5 dimensional coordinate transformation means 209. Next, when the mechanism element 416 is rotationally moved to the indicated direction and angle, an imaginary straight line 444 having both ends 442 and 443 is recognized, and by the simplified 2.5 dimensional coordinate transformation means 209, a finite straight line having both ends crossing with intersecting points 445 and 446 of the imaginary straight line 444 and the two imaginary ellipses 440 and 441 is formed to draw the mechanism element 435 after the motion in the display unit 204.

The sixth embodiment

Figure 37:
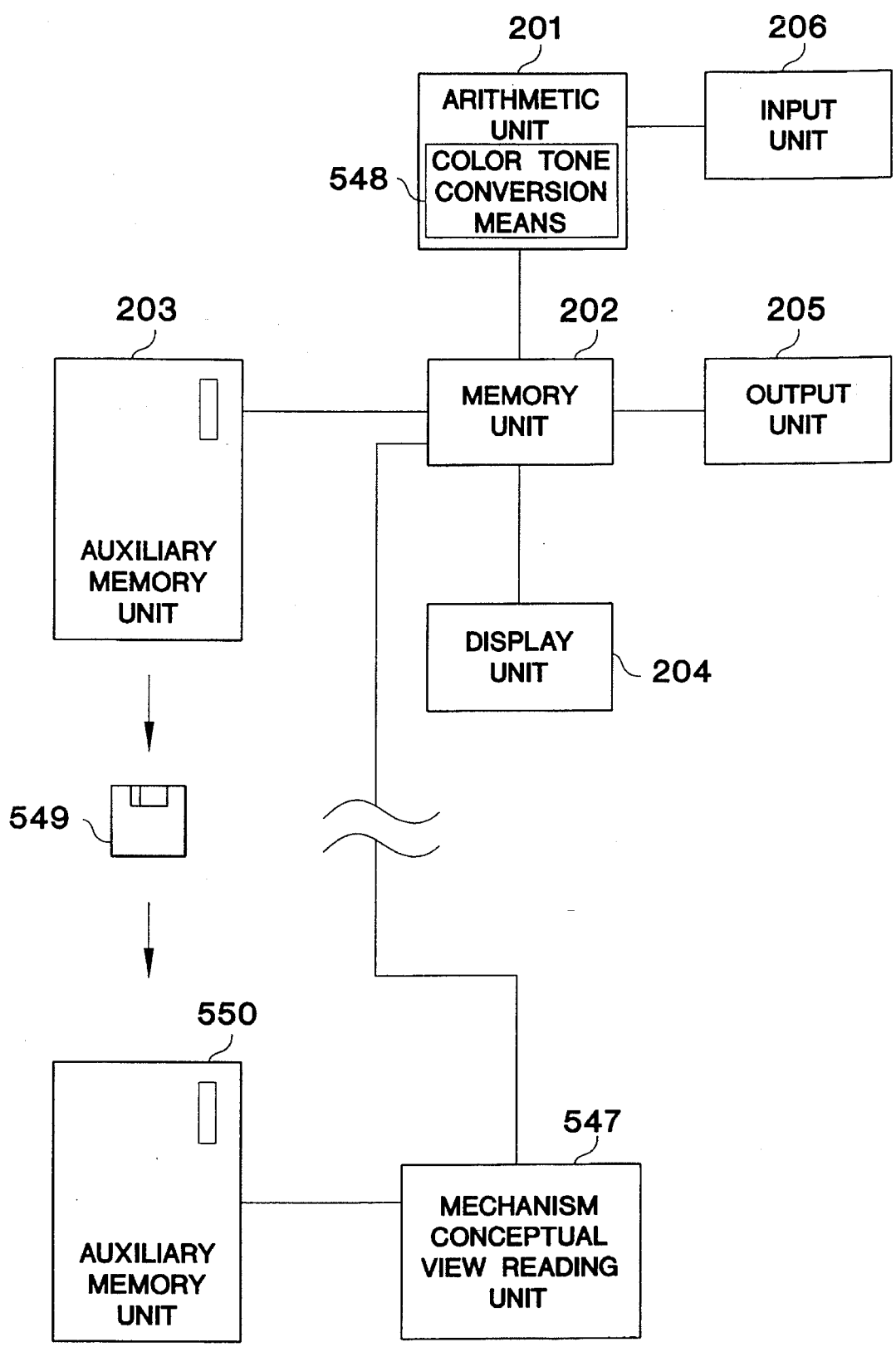
FIG. 37 is a block diagram of a sixth embodiment of a mechanism conceptual drawing operation display apparatus according to the present invention.

When the formed mechanism conceptual view 221 is transmitted to, for example, the Patent Office, as shown in FIG. 37, the image data of the mechanism conceptual view 221 are transmitted to a mechanism conceptual view reading unit 547 provided in the Patent Office. At this time, when, although the structure of the mechanism is displayed by the conceptual view, it is further complicated or it is still hard to understand the structure because of an overlapping of the elements before and after the motion in the conceptual view for exhibiting the operation, a designer or operator of the mechanism conceptual view 221 indicates a color tone to a certain mechanism element 216 by the input unit 206. Hence, the color tone of the indicated mechanism element is converted into a predetermined color tone by a color tone conversion means 548, and the tone-converted mechanism element is displayed on the display unit 204. The mechanism conceptual view reading unit 547 receives this color tone information together with the image data, and thus the color tone of the mechanism element 216 indicated by the operator of the mechanism conceptual view 221 can be discriminated by the mechanism conceptual view reading unit 547. For example, with an explanation of "a blue color represents an apparatus before motion and a red color represents the apparatus after the motion" in a main description of a specification, a construction and an operation of a mechanism can be understood in a short time.

Alternatively, not by an on-line transmission, the image data and the color tone data are recorded in a recording medium 549 by the auxiliary memory unit 203 and the recorded recording medium 549 is sent to the Patent Office. Then, in the Patent Office, the image data and the color tone data stored in the recording medium 549 are reproduced in an auxiliary memory unit 550 provided on the mechanism conceptual view reading unit 547 to read and understand the content of the mechanism conceptual view 221.

Figure 38:
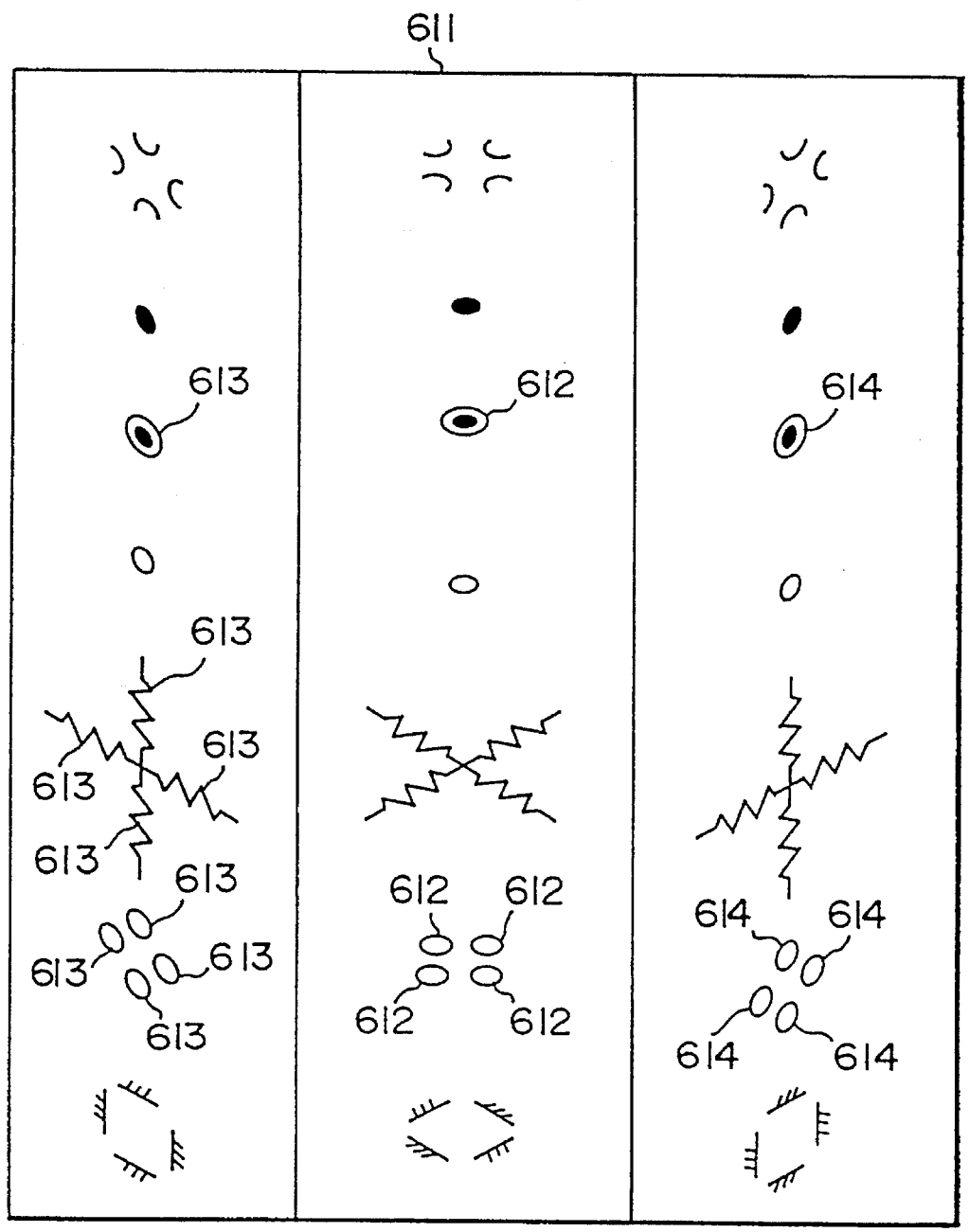
FIG. 38 is an elevational view of a selection area in another embodiment of the present invention.
Figure 39:
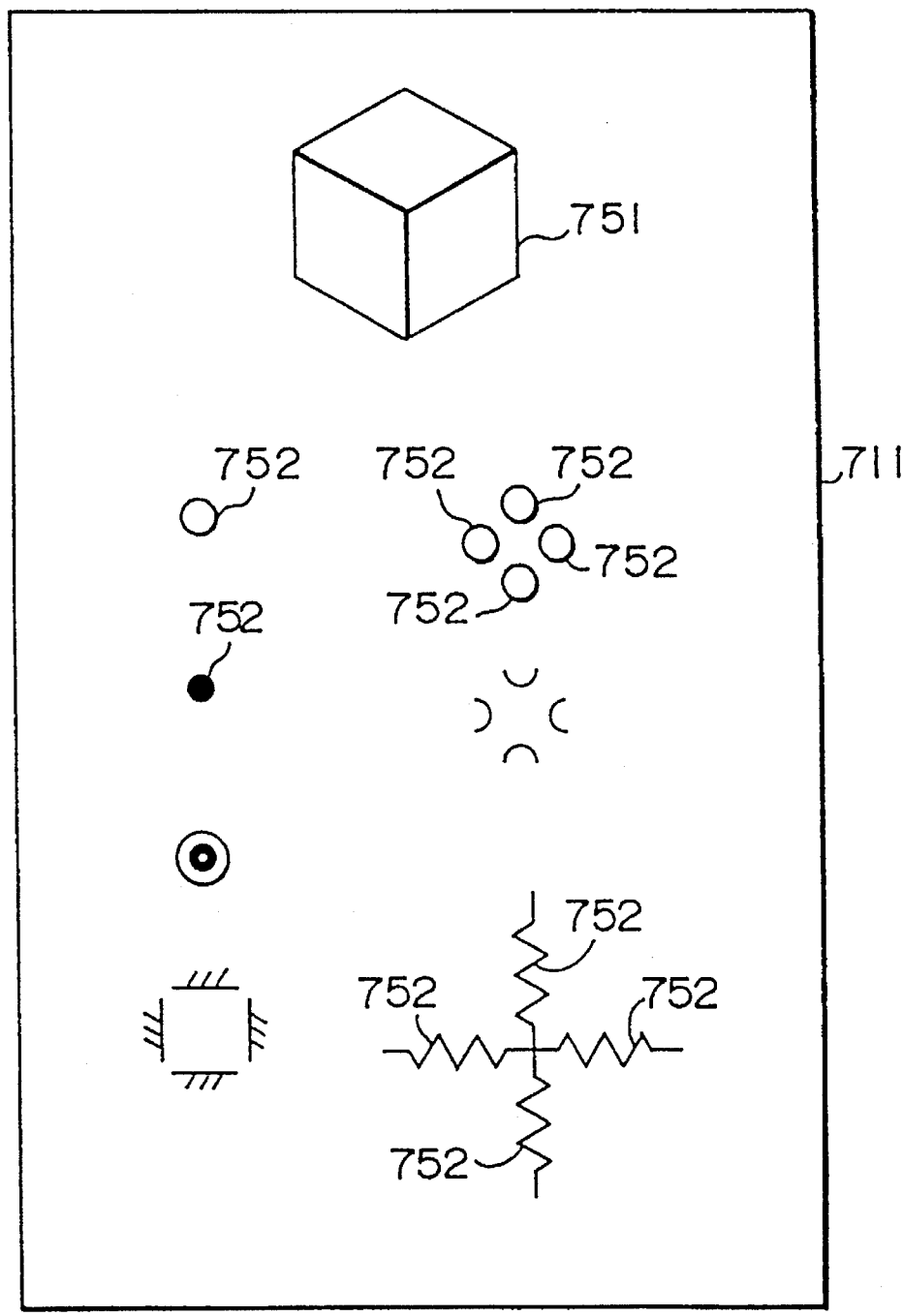
FIG. 39 is an elevational view of a selection area in another embodiment of the present invention.

In turn, although the skeleton perspective drawing method as the drawing method of the mechanism conceptual view 221 is used in the above-described third and fourth embodiments, not only a solid type but also a two-dimensional developing type of a flat type or another drawing method can be used. Also, in the above-described third and fourth embodiments, the different view points of symbol menus of the same meaning are adjoined each other and auxiliary frames parallel with baselines of the view points are arranged. However, as shown in FIG. 38, the same view point of symbol menus 612, 613 and 614 can be aligned in one row. Further, as shown in FIG. 39, when symbol menus displayed in a flat type and a selectable projection plane selection menu 751 are arranged in a selection area 711 so as to arrange certain symbol elements in a drawing area, a projection plane to be arranged can be selectively indicated from the selectable projection plane selection menu 751 by the input unit 206. In this case, by selectively indicating the angle seen from the view point of the selected projection plane and the corresponding symbol menu 752, the arranging position of the symbol element in the drawing area is pointed out to arrange the symbol element.

Figure 40:
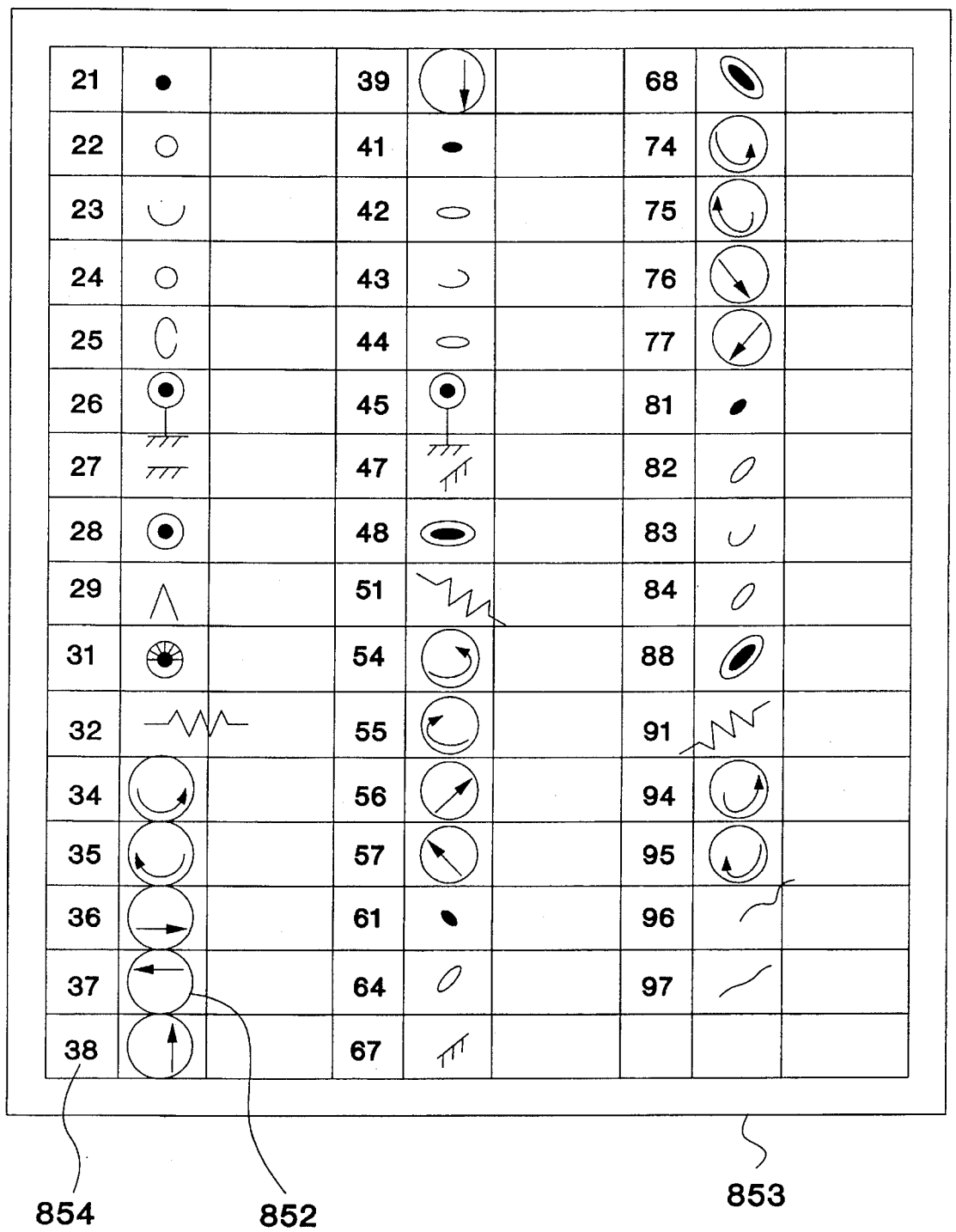
FIG. 40 an elevational view of a selection area in another embodiment of the present invention.

Also, although the selection area 211 is displayed on the display unit 204 in the above-described third and fourth embodiments, a selection area can be provided in an auxiliary input device such as a tablet or the like, and alternatively, as shown in FIG. 40, on a display paper such as a guidance card 853 or the like, symbol menus 852 and their numbers 854 or meanings of the symbols are displayed corresponding to each other, and by inputting the number 854 from the input unit 206, a certain symbol element 215 can be arranged in the arithmetic unit 201. Also, although picture symbols symbolizing mechanical elements of the mechanism conceptual view 221 are arranged in the selection area 211, motion symbols 255 symbolizing motions of the mechanism or leading symbols 256 symbolizing leading lines can be also arranged.

Further, although the wave number of the leading line is two in the above-described fourth embodiment, the division number of the distance between the leading start point 323 and the neighbor point 324 can be changed and other wave numbers of wave can be formed, or a selection function capable of selecting the wave number and the wave height 328 from the input unit 206 can be added in the wave line formation means 208. Also, although the pass points of the wave line are formed by the free-form curve obtained by the spline interpolation in the above-described fourth embodiment, this can be approximated by a combination of a part of a circle having a single radius passing through three adjacent pass points and a straight line to same the data amount.

As described above, according to the present invention, by the data of the conceptual view of the mechanism, the operation of the mechanism can be displayed by the image with movement. Also, the conceptual view of the mechanism can be transmitted to a far separated place via the facsimile. Hence, by drawing the complicated mechanism into the conceptual view, the mechanism can be readily understood. It can be said that the conceptual view can be readily come into a head of a human being against psychological perception and recognition without carrying out a complicated processing.

Further, since the present invention is constructed as described above, the following effects can be obtained.

Since a plurality of symbol menus having the same forms or the same meanings of the symbol elements are arranged at the different angles in the display area, there is no use for rotating the symbol element at a predetermined angle after the symbol element is arranged in the drawing area, and thus the arrangement input of the symbol element can be simplified to shorten the drawing formation time.

Further, since the intersecting line control means for dividing and deleting the intersecting part of the certain line when the line information intersects with the previously drawn line is provided, the operation for carrying out the selection and division of the intersecting line after drawing and the length adjustment of the same can be omitted to shorten the drawing work time.

Also, since the marking area for showing the actual drawn area of the figure is formed in the periphery of the drawing area, after the mechanism conceptual view is output from the output unit, the patching operation of the mechanism conceptual views on an exclusive paper readable by the scanner becomes unnecessary and thus, when a patent specification is electronically applied by using the mechanism conceptual views, the formation time can be reduced.

Further, since by indicating the start and end points by the input unit, the distance between the start and end points is calculated by the arithmetic unit and the wave line formation means for forming the wave line form leader line passing through the points of divisions divided into the certain numbers is provided, the arrangement input of the leader line can be simplified to shorten the drawing time.

Further, since the simplified 2.5 dimensional coordinate transformation means capable of adjusting the actual length of the line of the above-described mechanism element depending on the rotation angle when the mechanism element drawn in the drawing area is rotationally moved is provided, the perspective mechanism conceptual views can be readily formed by the orthographic projection method without providing a three-dimensional coordinate input device and thus the apparatus can be inexpensive.

Furthermore, since the mechanism can be displayed in different color tones before and after the motion and the color tone conversion means capable of transmitting the information of the color tones stored in the memory unit to another device such as the mechanism conceptual view leader device or the like, even the designer or operator of the mechanism conceptual view or the third party in the far separated place can be readable the color-separated mechanism elements and hence the structure of the mechanism conceptual view can be understood in a short time.

We claim:

1. An apparatus for forming mechanism conceptual views for expressing an operation of a machine, comprising:

an arithmetic device;

a memory device connected to the arithmetic device;

a display device connected to the memory device;

a drawing formation device connected to the arithmetic device; and an input device composed of a coordinate position indicating device and a key board, and connected to the arithmetic device; and wherein said arithmetic device and said input device cooperatively operate to recognize movable parts and fixed parts of a machine using conceptual view data, said conceptual view data formed in an apparatus for forming a mechanism view for expressing an operation of a machine, said conceptual view data representing at least one conceptual view of said machine;

said arithmetic device and said input device cooperatively operate to separate the conceptual view data representing at least one conceptual view of at least a portion of the movable parts of said machine from the conceptual view data representing at least one conceptual view of the fixed parts of said machine;

said arithmetic device and said memory device cooperatively operate to generate additional conceptual view data which represents a plurality of conceptual views of said movable parts based on said conceptual view data representing at least one conceptual view of at least a portion of said movable parts of said machine, said plurality of conceptual views of said movable parts representing motion of said movable parts;

said arithmetic device synthesizes said additional conceptual view data and the conceptual view data representing said conceptual view of said fixed parts to produce a plurality of mechanism conceptual views of said machine; and said memory device, said display device, and said drawing formation device cooperatively operate to dynamically display motion of said machine by sequential display of said mechanism conceptual views according to an elapsed time using output of said synthesis operation performed by said arithmetic device.

2. The apparatus of claim 1, wherein said memory device and said display device cooperatively operate to simultaneously display a plurality of mechanism conceptual views which constitute portions of the dynamic display.

3. A mechanism conceptual drawing operation display apparatus, comprising:

recognition means for recognizing movable parts and fixed parts of a machine using conceptual view data, said conceptual view data formed in an apparatus for forming a mechanism conceptual view for expressing an operation of a machine, said conceptual view data representing at least one conceptual view of said machine;

separation means for separating the conceptual view data representing at least one conceptual view of at least a portion of the movable parts of the machine from the conceptual view data representing at least one conceptual view of the fixed parts of the machine;

generating means for generating additional conceptual view data which represents a plurality of conceptual views of said movable parts based on said conceptual view data representing at least one conceptual view of at least a portion of said movable parts of said machine, said plurality of conceptual views of said movable parts representing motion of the movable parts;

synthesis means for synthesizing the additional conceptual view data and the conceptual view data representing the fixed parts of the machine to produce a plurality of mechanism conceptual views of said machine; and dynamic display means for dynamically displaying motion of the machine by sequential display of the mechanism conceptual views according to an elapsed time using output of the synthesis operation performed by the arithmetic device.

4. The apparatus of claim 3, further comprising plural view display means for simultaneously displaying a plurality of mechanism conceptual views which constitute portions of the dynamic display.

5. A mechanism conceptual drawing formation apparatus for forming a mechanism conceptual view of a machine, including a display device and an input device composed of a coordinate position indicating device and a key board, the mechanism conceptual drawing formation apparatus comprising a plurality of symbol menus arranged at different angles, the symbol menus each including symbol elements of a same form and meaning, symbol elements selected by the input device being arranged in a drawing area of the display device to form a mechanism conceptual view.

6. A mechanism conceptual drawing formation apparatus comprising:

an input device;

a display device; and an arithmetic device connected to said input device and display device, said arithmetic device including intersecting line control means for dividing and deleting an intersecting part of a previously drawn line when line information for the line to be drawn, input from the input device, intersects with the previously drawn line.

7. A mechanism conceptual drawing formation apparatus comprising:

an input device;

a display device; and an arithmetic device connected to said input device and display device; wherein said display device includes a marking area, the marking area having a marker for indicating, in a periphery of the drawn area, an actual drawn area of a figure, and further comprising an output device outputting the drawn figure in the drawn area and the marker at the same time.

8. A mechanism conceptual drawing formation apparatus comprising:

an arithmetic device for calculating a distance between start and end points of a leader line corresponding to names and numbers of mechanism elements of a mechanism conceptual view, an input unit for indicating the start and end points, and a wave line formation means for forming the leader line of a wave line form.

9. A mechanism conceptual drawing formation apparatus including two-dimensional coordinate input means for determining arrangement position of mechanism elements in a display based on coordinate information for an X-axis and a Y-axis intersecting perpendicular to the X-axis, the mechanism conceptual drawing formation apparatus comprising dimensional coordinate transformation means for adjusting an actual length of a line of a mechanism element depending on a rotating angle when rotation of the mechanism element is displayed.

10. A mechanism conceptual drawing operation display apparatus, comprising:

recognition means for recognizing movable parts and fixed parts of a machine using conceptual view data, said conceptual view data formed in an apparatus for forming a mechanism conceptual view for expressing an operation of a machine, said conceptual view data representing at least one conceptual view of said machine;

separation means for separating the conceptual view data representing at least one conceptual view of at least a portion of the movable parts of the machine from the conceptual view data representing at least one conceptual view of the fixed parts of the machine;

generating means for generating additional conceptual view data which represents a plurality of conceptual views of said movable parts based on said conceptual view data representing at least one conceptual view of at least a portion of said movable parts of said machine, said plurality of conceptual views of said movable parts representing motion of the movable parts;

synthesis means for synthesizing the additional conceptual view data and the conceptual view data representing the conceptual view of the fixed parts to produce a plurality of mechanism conceptual views of the machine; and plural view display means for simultaneously displaying said plurality of mechanism conceptual views.

11. A mechanism conceptual drawing formation apparatus, comprising:

an input unit receiving operator input;

a display unit including a drawing formation area and a selection area; and an arithmetic unit controlling the display unit in accordance with operator input received from the input unit, the arithmetic unit controlling the display unit to display, in the selection area, a plurality of symbol menus arranged at different angles, a same symbol element being included in each symbol menu of a different angle, and the arithmetic unit controlling the display unit to display, in the drawing formation area, symbol elements selected in accordance with operator input received from the input unit.

12. The apparatus of claim 11, wherein the arithmetic unit includes intersecting line control means for dividing and deleting an intersecting part of a previously drawn line when line information, input via the input unit, for a line to be drawn intersects with the previously drawn line.

13. The apparatus of claim 12, wherein the intersecting line control means, in response to operator input received by the input unit, divides and deletes an intersecting part of the line to be drawn, and redraws the divided and deleted intersecting part of the previously drawn line.

14. The apparatus of claim 11, wherein the display unit includes a marking area; and the arithmetic unit controls the display unit to display, in the marking area, a marker indicating an actual drawn area of a figure in the drawing formation area.

15. The apparatus of claim 14, wherein the display unit displays the marking area in a peripheral portion of the drawing formation area.

16. The apparatus of claim 11, wherein the input means inputs start and end points for a leader line corresponding to reference names and numbers of symbol elements in a mechanism conceptual view; and the arithmetic unit includes calculating means for calculating a distance between the start and end points, and a wave line formation means for forming a wave line form as the leader line based on the calculated distance.

17. The apparatus of claim 16, wherein the wave line formation means forms the wave line form based on division points between the start and end point.

18. The apparatus of claim 11, wherein the input unit inputs coordinate information; and the arithmetic unit includes means for determining an arrangement position of mechanism elements to be drawn in the mechanism conceptual drawing, and further includes dimensional coordinate transformation means for adjusting an actual length of a line of a mechanism element to be drawn depending on a rotating angle when rotation of the mechanism element to be drawn is displayed.

19. A mechanism conceptual formation apparatus, comprising:

an input unit receiving operator input;

a display unit; and an arithmetic unit assigning color tones to at least one mechanism element in a mechanism conceptual view based on operator input, different color tones being assigned to the same mechanism element to distinguish between pre-movement and post-movement views of the mechanism element, the arithmetic unit including a color tone conversion means for transmitting information of the assigned color tones to another device.

20. An apparatus for forming a mechanism conceptual views for expressing an operation of a machine, a mechanism conceptual drawing operation display apparatus, comprising:

an arithmetic device;

a memory device connected to the arithmetic device;

a display device connected to the memory device;

a drawing formation device connected to the arithmetic device; and an input device composed of a coordinate position indicating device and a key board, and connected to the arithmetic device; and wherein said arithmetic device and said input device cooperatively operate to recognize movable parts and fixed parts of a machine using conceptual view data, said conceptual view data formed in an apparatus for forming a mechanism view for expressing an operation of a machine, said conceptual view data representing at least one conceptual view of said machine;

said arithmetic device and said input device cooperatively operate to separate the conceptual view data representing at least one conceptual view of at least a portion of the movable parts from the conceptual view data representing the fixed parts of the machine;

said arithmetic device and said memory device cooperatively operate to generate additional conceptual view data which represents a plurality of conceptual views of said movable parts based on said conceptual view data representing at least one conceptual view of at least a portion of said movable parts of said machine, said plurality of conceptual views of said movable parts representing motion of the movable parts;

said arithmetic device synthesizes the additional conceptual view data and the conceptual view data representing the conceptual view of the fixed parts to produce a plurality of mechanism conceptual views; and said memory device and said display device cooperatively operate to simultaneously display the plurality of mechanism conceptual views.

21. An apparatus for converting a machine structure drawing into a mechanism conceptual view in which component elements are symbolized so as to allow an individual to more easily understand the operation of a complicated machine, the apparatus comprising:

symbol defining means for separately defining mechanism component element symbols denoting minimum functional units of the machine and defining operation symbols denoting operations of the machine;

selecting means for selecting mechanism component element symbols from the defined mechanism component element symbols in accordance with data representing the machine structure drawing;

depicting the selected mechanism component element symbols in a position in accordance with the data representing the machine structure drawing;

connecting means for connecting the depicted mechanism component element symbols with line segments corresponding to the data representing the machine structure drawing so as to produce a perspective view; and means for selecting from the defined operation symbols operation symbols corresponding to at least one of the depicted mechanism component element symbols and the line segments shown in the perspective view, and for adding the selected operation symbols as independent symbols in the vicinity of the at least one of the depicted mechanism component element symbols and the line segments; wherein said symbol defining means defines a plurality of mechanism component element symbols representing machine structure observed at different angles so as to produce the perspective view by selectively arranging defined mechanism component element symbols.

22. The apparatus of claim 21, wherein the connecting means connects new line segments across existing line segments by deleting one of the new and existing line segments at an intersection of the new and existing line segment.

23. The apparatus of claim 21, further comprising color tone varying means for varying color tones of the mechanism component element symbols.

24. The apparatus of claim 21, further comprising color tone varying means for indicating operation of the mechanism component element symbols in different color tones.

* * * * *